US006068197A

United States Patent [19]
Tolson

[11] Patent Number: 6,068,197
[45] Date of Patent: May 30, 2000

[54] PIVOTING LATERAL MOVE IRRIGATION SYSTEM WHICH WATERS IN THE PIVOT MODE

[75] Inventor: Harold N. Tolson, East Bernard, Tex.

[73] Assignee: Hlavinka Equipment Company, East Bernard, Tex.

[21] Appl. No.: 09/016,218

[22] Filed: Jan. 30, 1998

[51] Int. Cl.$^7$ ........................................................ B05B 3/00
[52] U.S. Cl. ................................ 239/1; 239/722; 239/723; 239/724; 239/735; 239/741; 239/742; 239/DIG. 1; 239/726
[58] Field of Search ........................... 239/1, 722, 723, 239/724, 726, 735, 737, 741, 742, DIG. 1

[56] References Cited

U.S. PATENT DOCUMENTS

| | | | |
|---|---|---|---|
| 3,726,478 | 4/1973 | McMurray | 239/724 X |
| 4,099,699 | 7/1978 | Cortopassi | 239/724 X |
| 4,172,551 | 10/1979 | Johnson | 239/724 X |

FOREIGN PATENT DOCUMENTS

| | | | |
|---|---|---|---|
| 257190 | 2/1928 | Italy | 239/726 |
| 3121 | 10/1905 | United Kingdom | 239/724 |

*Primary Examiner*—Kevin Weldon
*Assistant Examiner*—Robin O. Evans
*Attorney, Agent, or Firm*—Conley, Rose & Tayon; Jeffrey C. Hood

[57] ABSTRACT

A pivoting lateral move irrigation system which operates to water in the pivot mode. The irrigation system includes a conduit extending over the field to be irrigated, and a series of support towers which are spaced along the length of the conduit and support the conduit. The power tower is designed for lateral movement and includes a pivoting top according to the present invention. In the preferred embodiment, the irrigation system is a ditch fed system which moves laterally to a canal or ditch, from which water is obtained for irrigation. The power panel includes switches to allow the machine to pivot at the end or corner of the canal. According to the present invention, during pivoting, the irrigation system operates to irrigate, i.e., provide water to the field, during the pivot operation. In one embodiment, the irrigation system includes a hydraulic lift device which operates to lift the power tower off of the ground, swivel or turn the power tower an desired number of degrees, and then lower the power tower for further lateral movement.

37 Claims, 21 Drawing Sheets

PIVOTING LATERAL MOVE IRRIGATION SYSTEM WHICH WATERS IN THE PIVOT MODE

BACKGROUND OF THE INVENTION

1. Field of the Invention

The present invention relates to a pivoting ditch fed lateral move irrigation system that is capable of watering in the pivot mode.

2. Description of the Relevant Art

Common types of agricultural irrigation machines include the types known as center pivot machines and lateral move or ditch fed irrigation systems. Center pivot irrigation machines include a main pipeline section supported at intervals on movable towers for rotation about a center point comprised at the inner end of the pipeline. Water is supplied to the fixed inner end of the pipeline and distributed to the sprinklers placed along the pipeline. The main pipeline section thus moves about its central pivot point to irrigate a circular portion of the field.

Lateral or linear move irrigation systems, also sometimes referred to as ditch fed irrigation systems, generally move laterally in relation to a ditch or canal full of water. FIG. 1 illustrates a ditch fed lateral move irrigation system according to the prior art. FIG. 2 illustrates a field including a canal or ditch which extends along one side of the field in which a lateral move irrigation system is typically used according to the prior art. Lateral move irrigation system, such as disclosed in U.S. Pat. No. 4,172,551, generally comprise an elongated water conduit which extends over the field to be irrigated. The conduit is supported by a series of support towers spaced along its length. Each of the support towers is generally self-propelled so that the conduit may be moved across the field to be irrigated. The lateral move irrigation system includes an end support tower, referred to as the power tower, which obtains the water from a canal or ditch which extends along one side of the field. Normally, a road or cart path is provided along the length of the ditch adjacent thereto with the endmost support tower traveling along the road or cart path. A water inlet pipe or hose is operatively connected to the end support tower positioned on the road with one end of the water inlet pipe being located in the ditch to draw water into the system. A pump located on the power tower is generally used to enable the pipe or hose to draw water from the canal or ditch and provide the water to the conduit. Sprinklers located along the conduit receive the water and operate to irrigate the field.

Lateral move irrigation systems generally work well where the agricultural field only extends along one side of the canal or ditch. However, in many fields the canal or ditch is L shaped, U-shaped and/or has another type of nonlinear orientation. In these types of fields, a standard lateral move irrigation system is only capable of irrigating a portion of the field. Therefore, it is a principal object of the present invention to provide a lateral move irrigation system that is capable of watering non-linear or irregularly shaped fields.

SUMMARY OF THE INVENTION

The present invention comprises a pivoting lateral move irrigation system which operates to water in the pivot mode. The irrigation system includes a conduit extending over the field to be irrigated, and a series of support towers which are spaced along the length of the conduit that support the conduit. The end support tower, referred to as the power tower, is designed for lateral movement and includes a pivoting top according to the present invention. In the preferred embodiment, the irrigation system is a ditch fed system which moves laterally to a canal or ditch, from which water is obtained for irrigation. The power panel includes switches to allow the machine to pivot at the end or corner of the canal. According to the present invention, during pivoting, the irrigation system operates to irrigate, i.e., provide water to the field, during the pivot operation. In one embodiment of the invention, the irrigation system includes a hydraulic lift device which operates to lift the power tower off of the ground, swivel or turn the power tower a desired number of degrees, and then lower the power tower for further lateral movement.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

Figure 1:
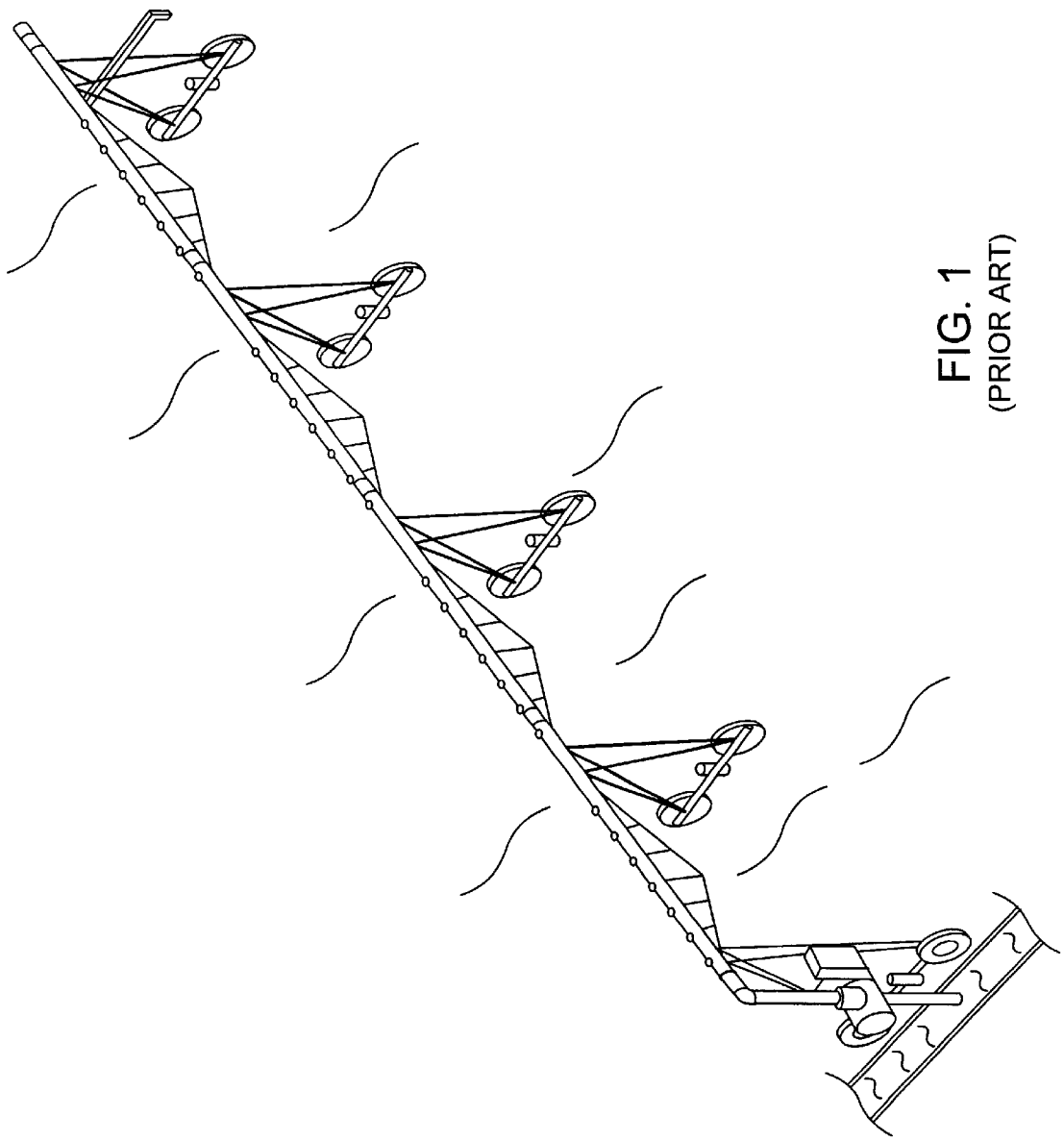
FIG. 1 illustrates a ditch fed lateral move irrigation system according to the prior art.
Figure 2:
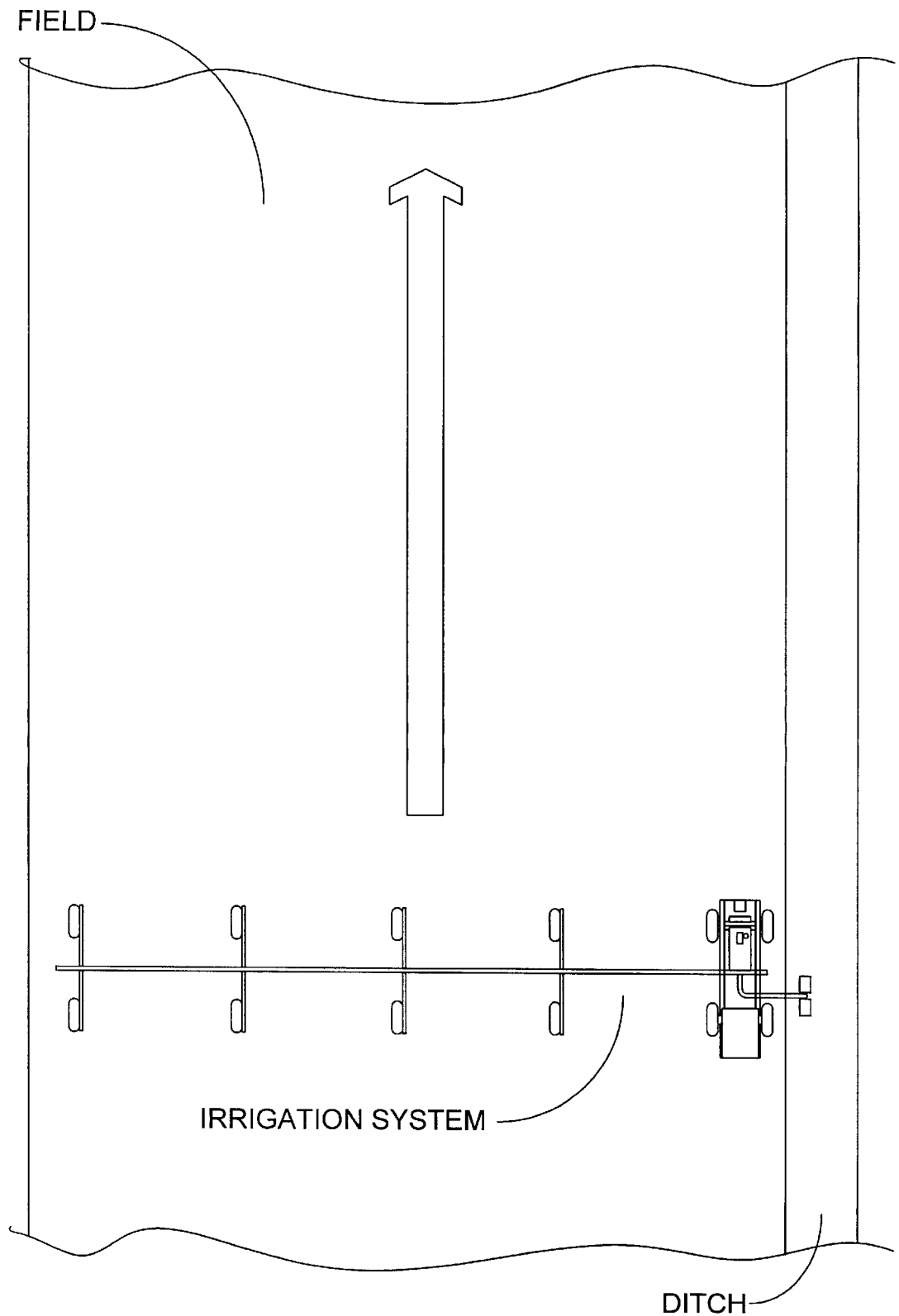
FIG. 2 illustrates a field including a canal or ditch which extends along one side of the field in which a lateral move irrigation system is typically used according to the prior art.
Figure 3:
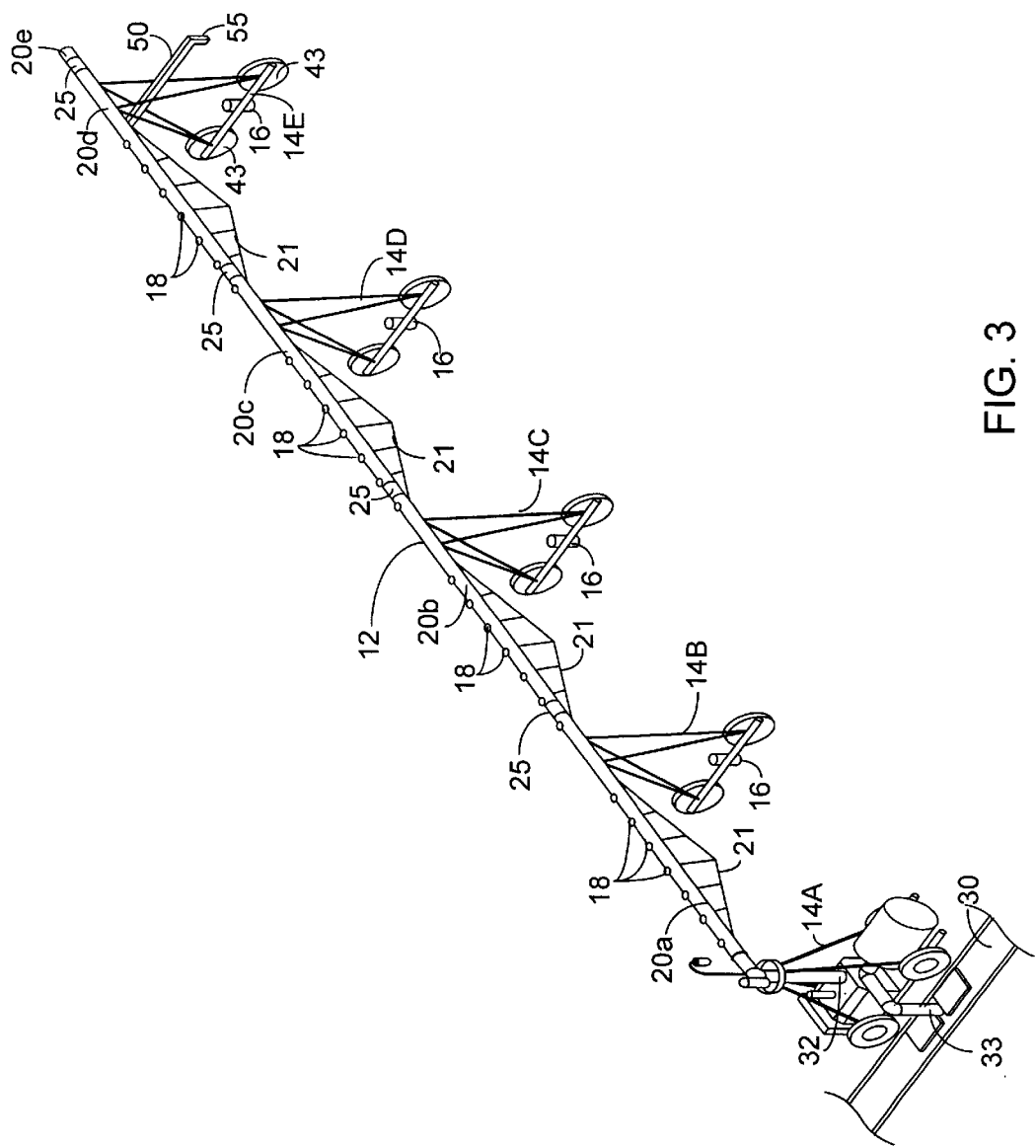
FIG. 3 illustrates a pivoting ditch fed lateral move irrigation system which waters in the pivot mode according to the preferred embodiment of the invention.

FIG. 3 is a schematic diagram illustrating a pivoting lateral move irrigation system according to the preferred embodiment of the invention. The irrigation system 10 includes a conduit 12 extending over the field to be irrigated. It is noted that the conduit 12 may be any of various lengths depending upon the width of the field being irrigated. A series of support towers 14, labeled 14A–14E, are spaced along the length of the conduit 12 and support the conduit 12. Each of the towers 14 are preferably self-propelled such as by an electric motor 16 and appropriate gear boxes or the like as commonly known in the art. A series of dispensers or sprinklers 18 are located along the conduit for dispensing of liquid, e.g., water, fertilizer, etc., through the conduit 12 and on to the field. For more information on the composition of a conduit and other components used in a lateral move irrigation system, please see U.S. Pat. No. 4,172,551 which is hereby incorporated by reference as though fully and completely set forth herein.

A lateral move irrigation system is characterized by the movement of the entire irrigation system down the field to be irrigated. In a ditch fed system according to the preferred embodiment, a ditch or canal 30, referred to generically as an irrigation ditch, filled with water extends along the portion of the field at one side. However, it is noted that the canal or ditch 30 can also be located at another position such as at the interior portion, e.g., center, of the field. As discussed further below, the pivoting lateral move irrigation system of the present invention is capable of being used in fields where the canal or ditch has an L shape, "racetrack" shape, or other non-standard or non-linear shape.

The tower 14A nearest the canal 30, referred to as the power tower, includes a pump 32 with a conduit or inlet pipe 33 extending into the canal 30. The power tower 14A nearest the canal, including the pump 32 and conduit 33, moves along with the entire irrigation system 10. The water in the canal or ditch 30 is pumped from the canal 30 and provided to the conduit 12 for disbursement through the sprinklers 18, thereby irrigating the field.

As discussed further below, the power tower 14A includes pivoting components and is operable to pivot the irrigation system 10, i.e., is operable to pivot the conduit 12 and support towers 14. Further, the irrigation system 10 is operable to water in the pivot mode, i.e., the power tower 14A is operable to provide water to the conduit 12 for irrigating the field while the conduit 12 and support towers 14 are being pivoted.

Figure 4:
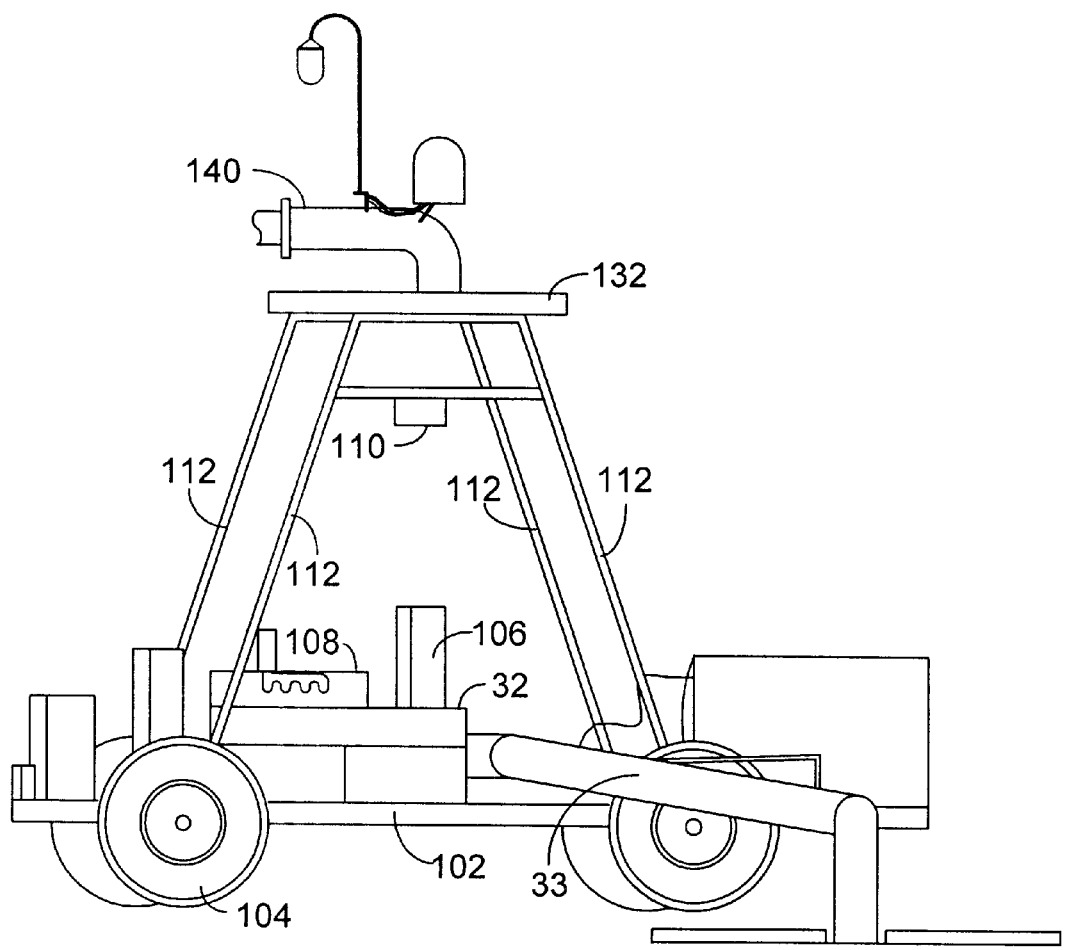
FIG. 4 illustrates one embodiment of the power tower of the pivoting lateral move irrigation system of FIG. 3 which operates to water in the pivot mode.

FIG. 4—Power tower (Non-Swiveling Embodiment)

Figure 5:
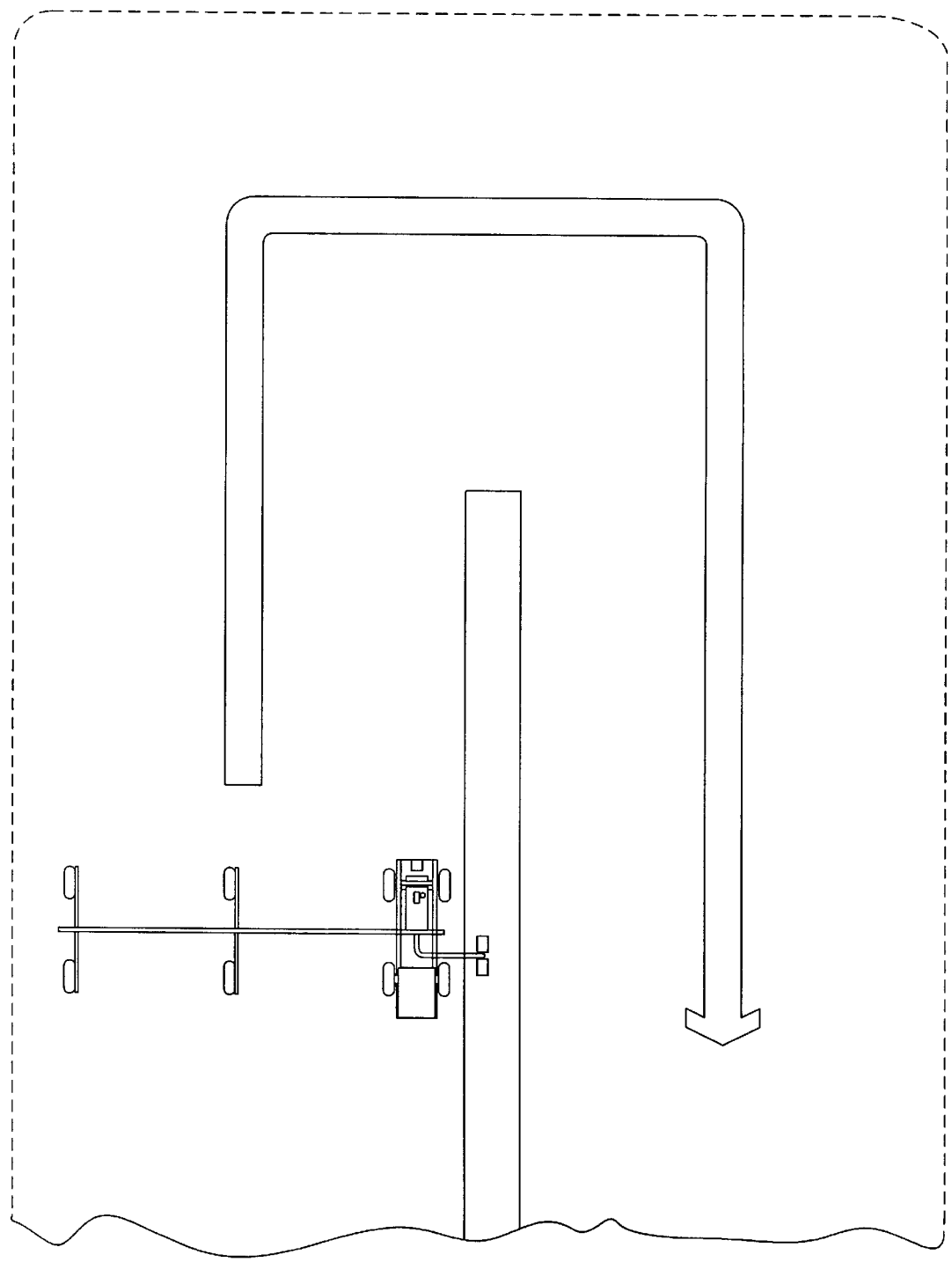
FIG. 5 illustrates one example of a field where the power tower of FIG. 4 may be used.

FIG. 4 is a close up view of one embodiment of the power tower 14A which enables the lateral movement and pivoting of the irrigation system 10 according to the present invention. This embodiment of the power tower 14A is designed to enable the irrigation system 10 to irrigate, for example, the field of FIG. 5. The operation of the irrigation system 10 irrigating the field of FIG. 5 is shown in FIGS. 5A–5G. It is noted that the power tower 14A is also operable to enable the irrigation system 10 to irrigate various other types of fields having various configurations, as desired.

As shown, the power tower 14A includes one or more generally horizontal beams 102. When the irrigation system 10 is in a lateral mode as shown in FIG. 3, the horizontal beams 102 are parallel to the canal 30 and extend transversely to the conduit 12. Wheels 104 are mounted at each end of the beam 102. In the preferred embodiment, the power tower 14A includes four wheels 104 as shown. The wheels 104 are driven, for example, by an engine or electronic motor 106. The motor or engine 106 is preferably a gasoline powered motor or other type of motor or engine as desired. As shown, the power tower 14A includes preferably four truss members 112 extending between the two horizontal beams 102 and plate 132. The power tower 14A also preferably includes a pump 108 or other mechanism for drawing or pumping water from the irrigation ditch 30 and providing the water through pivot top 140 to conduit 12.

The plate 132 is mounted to the truss members or braces 112. The plate 132 is preferably a ¾ inch metal plate. The pivot top 140 including a collector ring is mounted or attached to the plate 132. The collector ring receives electricity from a generator located on the power tower 14A and dispenses electricity to the towers 14. In the preferred embodiment, the pivot top 140 is welded and bolted to the plate 132 as shown in FIG. 4. The pivot top connects to the conduit 12. The pivot top 140 is operable to pivot the irrigation system 10. More particularly, the pivot top 140 is operable to pivot the conduit 12 and support towers 14.

Power tower 14A includes a power panel 110. Switches referred to as "pivot/lateral" and "panel outside span/panel inside span" are included in the power panel 110 to allow the machine to pivot at the end of the field. Thus, when the irrigation system 10 reaches the end of the field, the "pivot/lateral" switch is depressed to enable the irrigation system 10 to pivot about the power tower 14A, i.e., to enable the conduit 12 and support towers 14 to be pivoted by the pivot top 140. As noted above, during pivoting, the irrigation system 10 still operates to irrigate, i.e., provide water to the field, during the pivot operation. After the power tower 14A pivots conduit 12 and support towers 14 180 degrees, the panel outside span/panel inside span switch is used to change forward and reverse directions in the lateral mode to enable the irrigation system to move laterally in the opposite direction.

FIG. 5—Example Operation

FIG. 5 illustrates one example of a field where the power tower 14A and irrigation system 10 may be used. In FIG. 5, the irrigation ditch 30 is positioned in an interior portion of the field, e.g., substantially in the center of the field. The field includes a left portion located to the left of the irrigation ditch, a right portion located to the right of the irrigation ditch, and one or more of a top portion and a bottom portion above and below, respectively, the irrigation ditch. FIG. 5 illustrates left, right and top portions of the field.

Figure 5A:
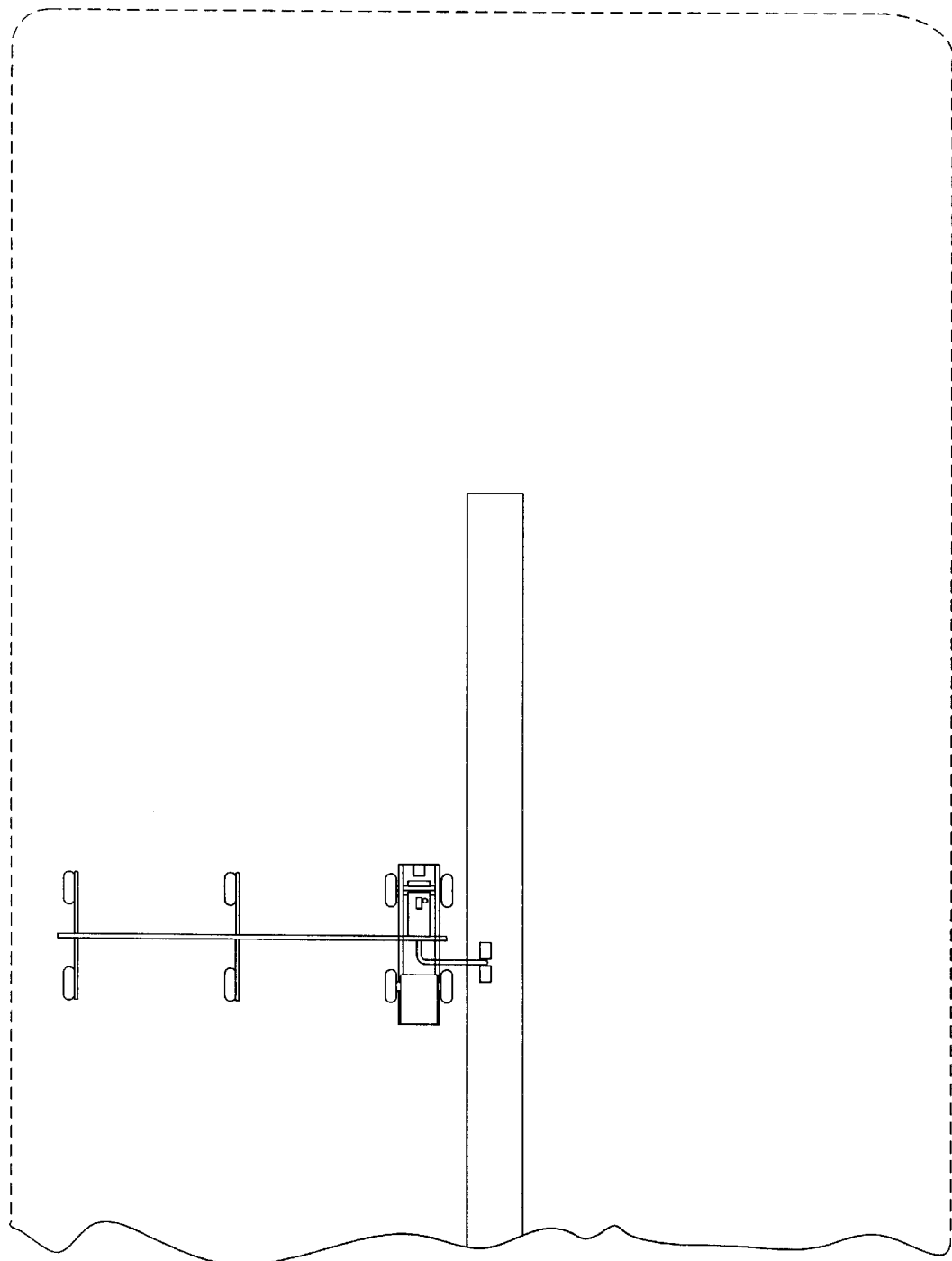
FIGS. 5A–5G illustrate movement of the irrigation system across the field of FIG. 5.
Figure 5B:
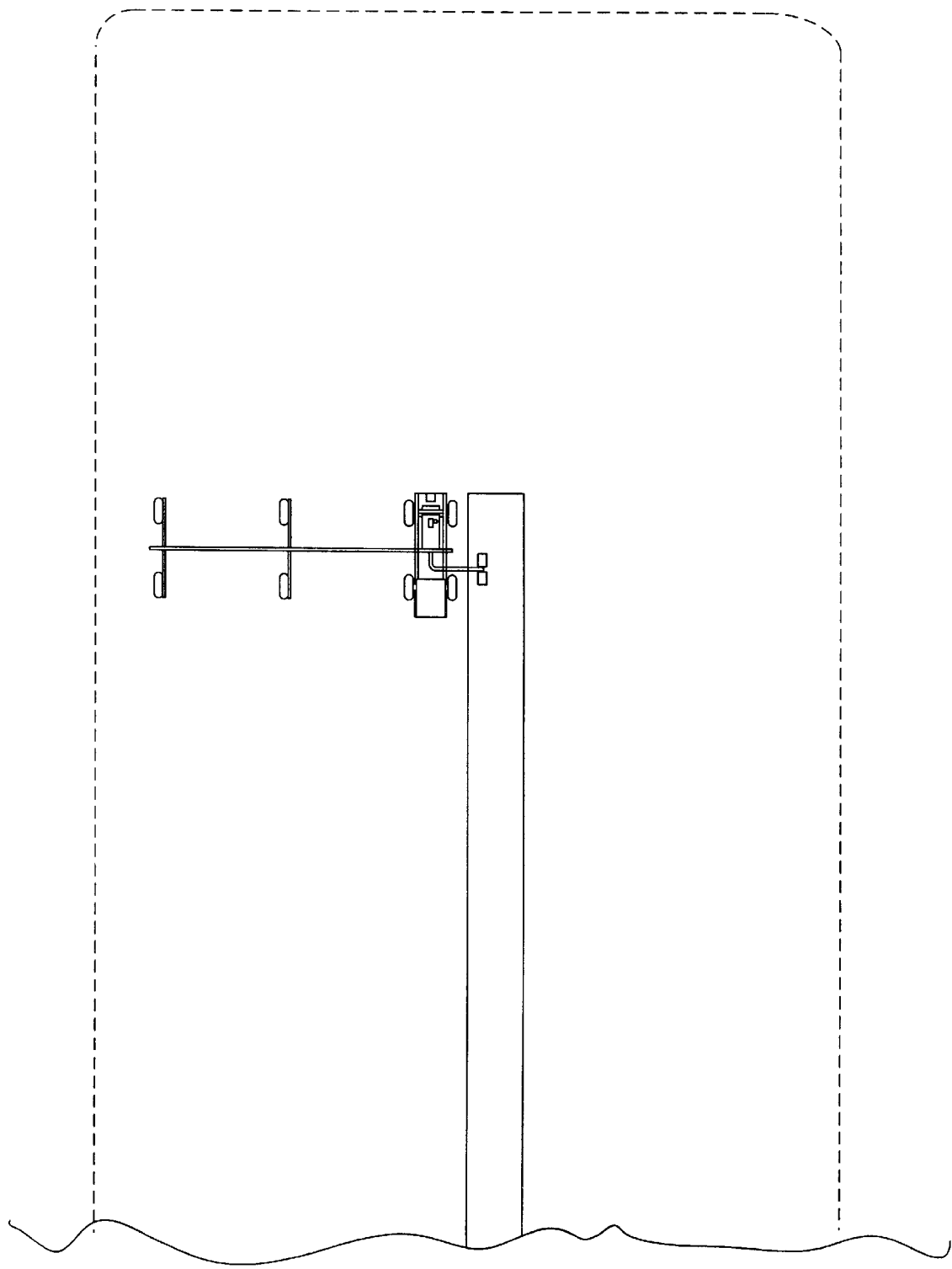
Figure 5C:
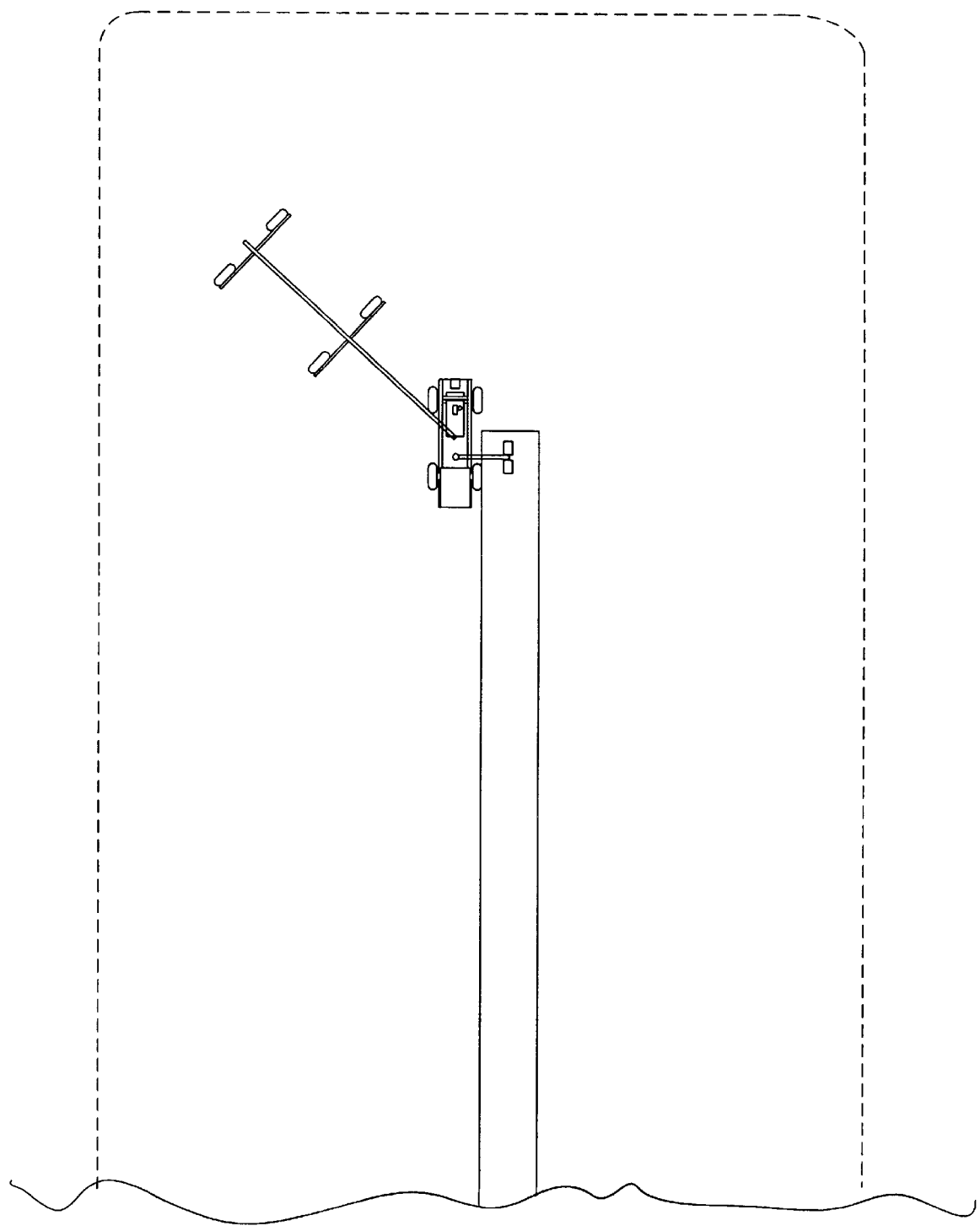
Figure 5D:
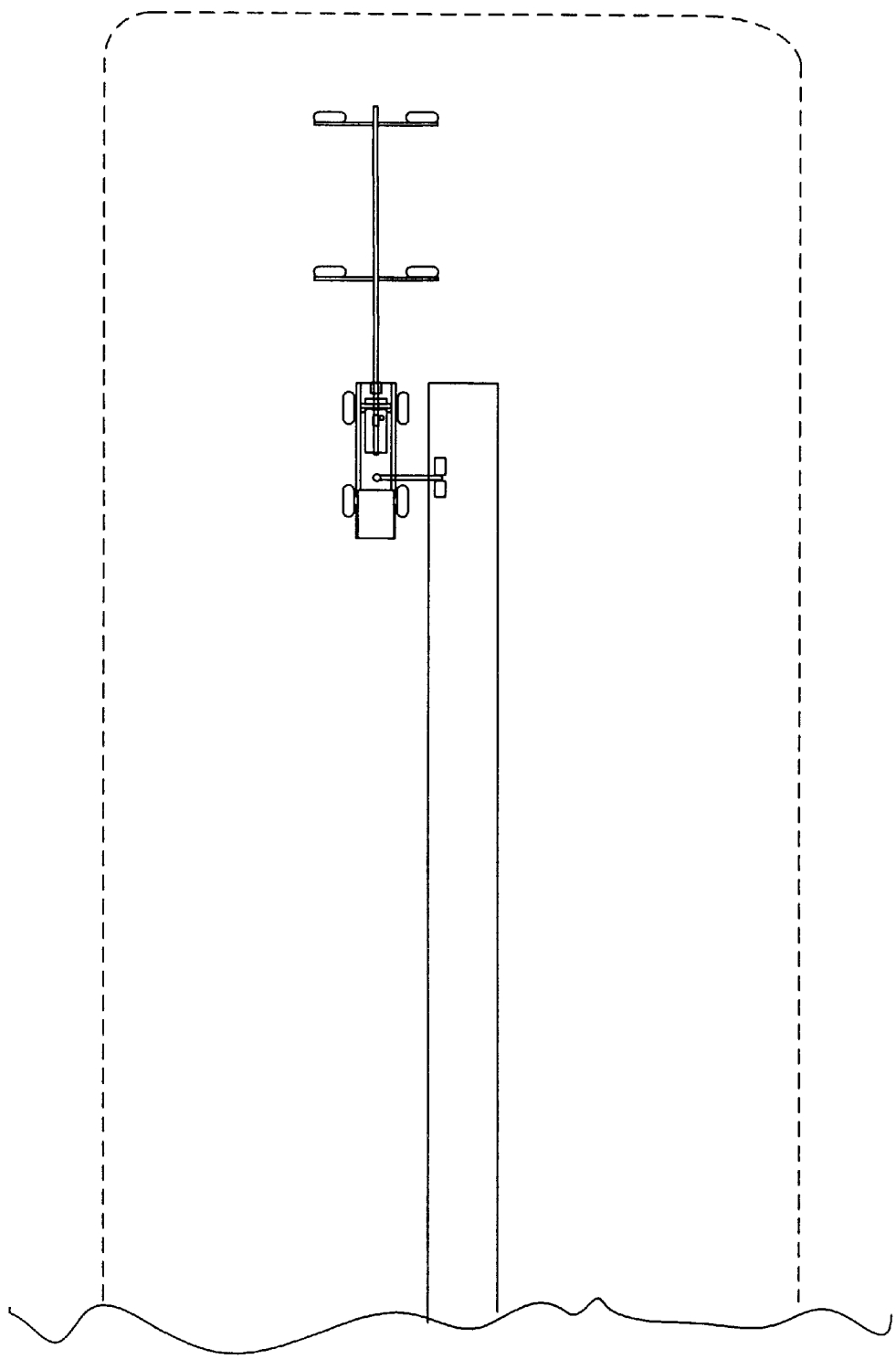
Figure 5E:
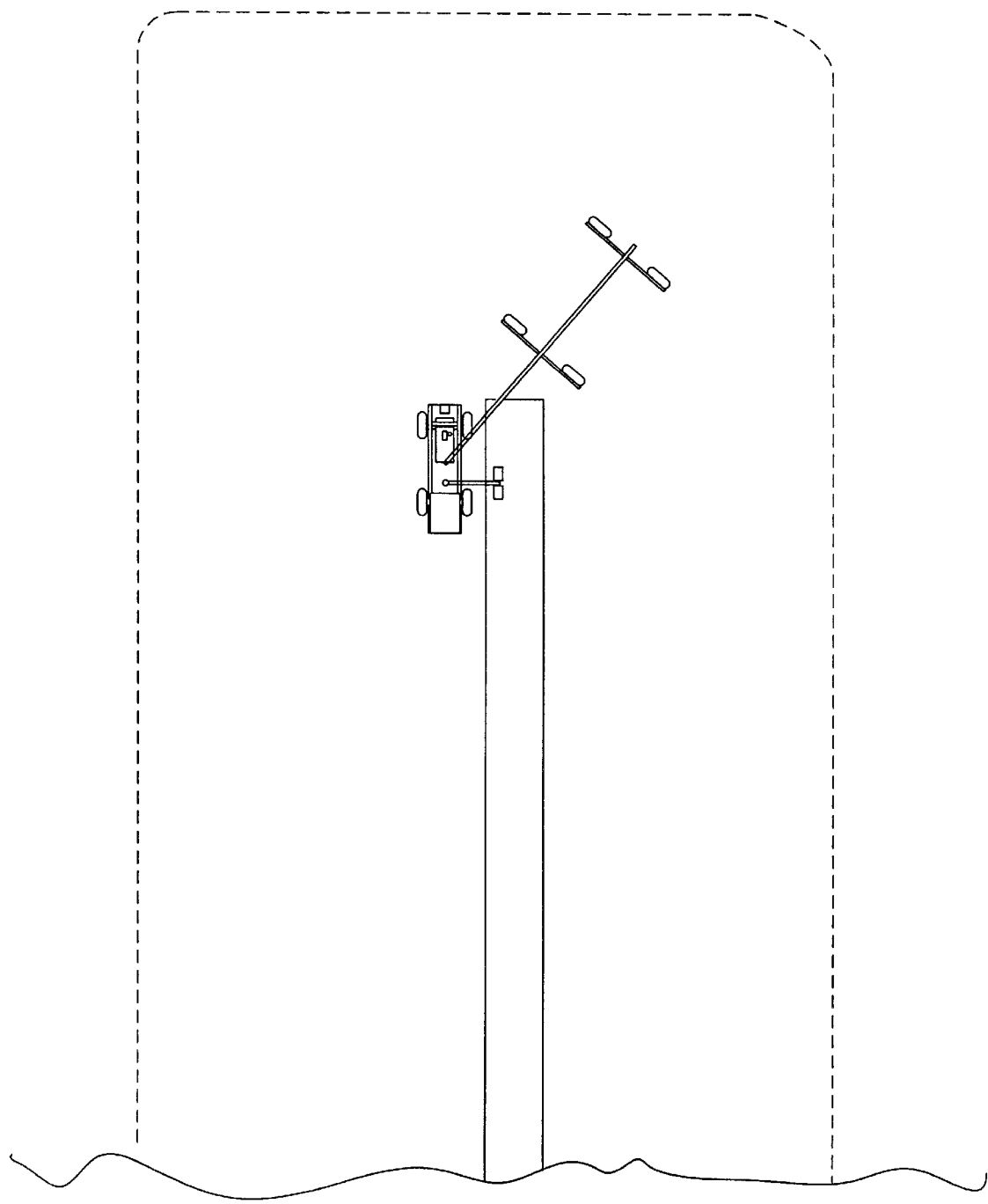

FIGS. 5A–5G illustrate movement of the irrigation system 10 to irrigate the field of FIG. 5. In the field of FIG. 5, the irrigation system 10 moves laterally to irrigate the left portion of the field as shown in FIGS. 5A and 5B. When the irrigation system 10 reaches the end (top) of the field as shown in FIG. 5B, the "pivot/lateral" switch is preferably depressed to enable the irrigation system 10 to pivot about the power tower 14A, i.e., to enable the conduit 12 and support towers 14 to be pivoted by the pivot top 140. The power tower 14A thus operates to pivot the conduit 12 and support towers 14 to irrigate the top of the field, as shown in the progression of FIGS. 5B–5F. In this embodiment, the power tower 14A pivots the conduit 12 and support towers 14 by approximately 180 degrees. It is noted that, during pivoting, the irrigation system 10 still operates to irrigate, i.e., provide water to the field, during the pivot operation. Thus, during pivoting, the irrigation system 10 irrigates the top portion of the field as the conduit 12 and support towers 14 pivot from the left portion of the field to the right portion of the field, as shown in FIGS. 5B–5F.

Figure 5F:
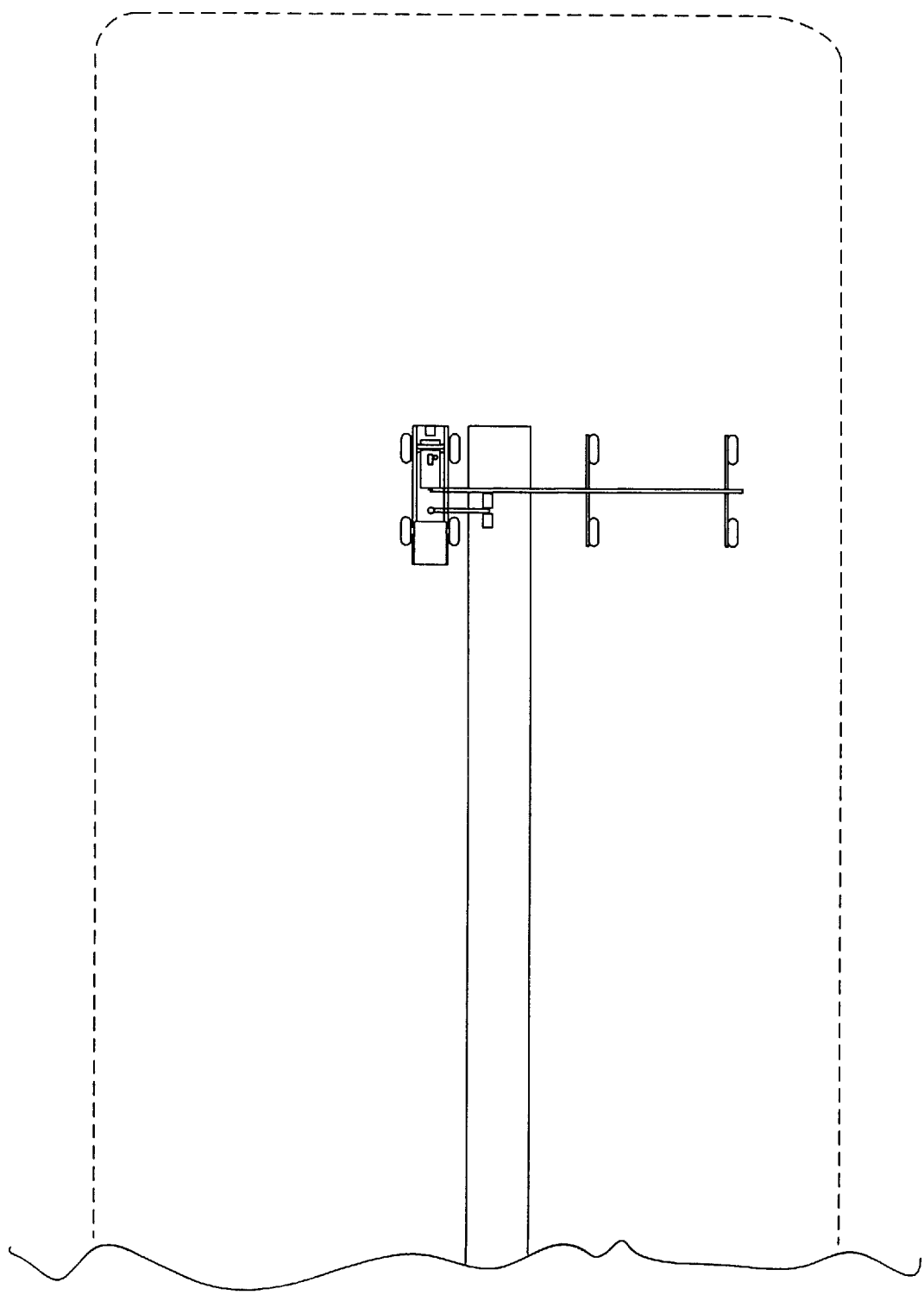
Figure 5G:
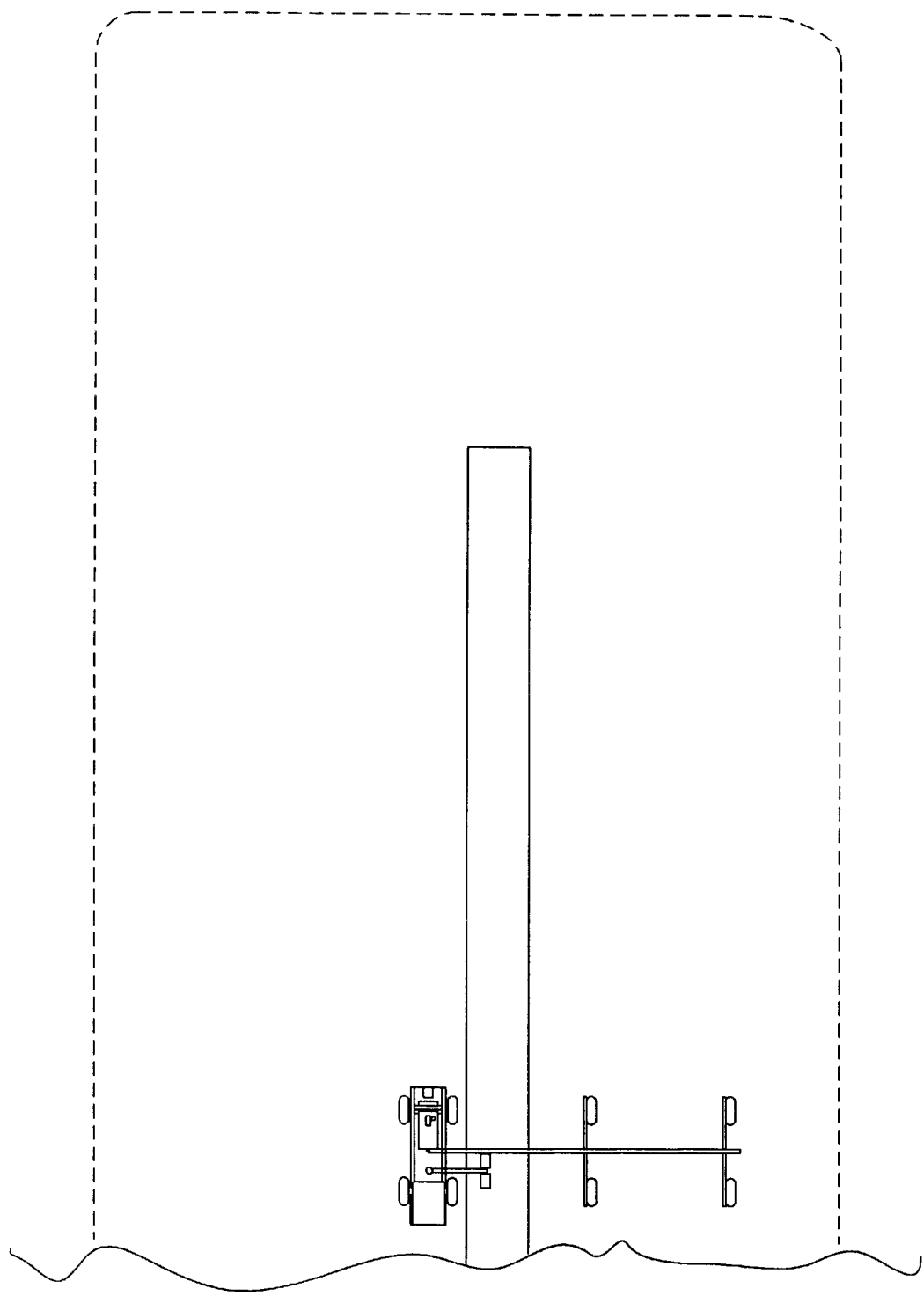

After the power tower 14A has pivoted the conduit 12 and support towers 14 the entire 180 degrees, the panel outside span/panel inside span switch is preferably used to change forward and reverse directions in the lateral mode to enable the irrigation system to move laterally in the opposite direction. The irrigation system 10 then moves laterally, as shown in FIGS. 5F and 5G, to irrigate the portion of the field to the right of the canal. Thus, after pivoting, the irrigation system 10 then resumes lateral movement operation, in the opposite direction, with the conduit 12 and support towers 14 located on the other side (right side) of the canal or ditch 30, as shown.

It is noted that the field of FIG. 5 may be a U-shaped field or a "racetrack" shaped field. In a U-shaped field, the field includes a top portion or a bottom portion, but not both. If the field is a U-shaped field, e.g., includes a top portion but no bottom portion, after the irrigation system 10 moves laterally to irrigate the right portion of the field as shown in FIGS. 5F and 5G, the irrigation system then moves in the opposite direction, i.e., repeats the above movement in the opposite direction. Thus, the irrigation system 10 re-irrigates the right portion of the field, pivots to irrigate the top portion, and then irrigates the left portion. In other words, the irrigation system 10 moves according to the sequence of FIGS. 5G–5A. This operation is repeated to irrigate the field as many times as desired.

If the field is "racetrack" shaped, then the field includes both top and bottom portions, as well as left and right portions. In this instance, the bottom portion of the field (not shown in FIG. 5) is preferably shaped similarly to the top portion. If the field is "racetrack" shaped, then after the irrigation system 10 moves laterally to irrigate the right portion of the field as shown in FIGS. 5F and 5G, and the irrigation system reaches the other end of the field, then the irrigation system 10 pivots at this other end of the field to irrigate the bottom portion. The irrigation system 10 pivots in the same manner as shown and discussed above with reference to FIGS. 5B–5F.

Figure 6:
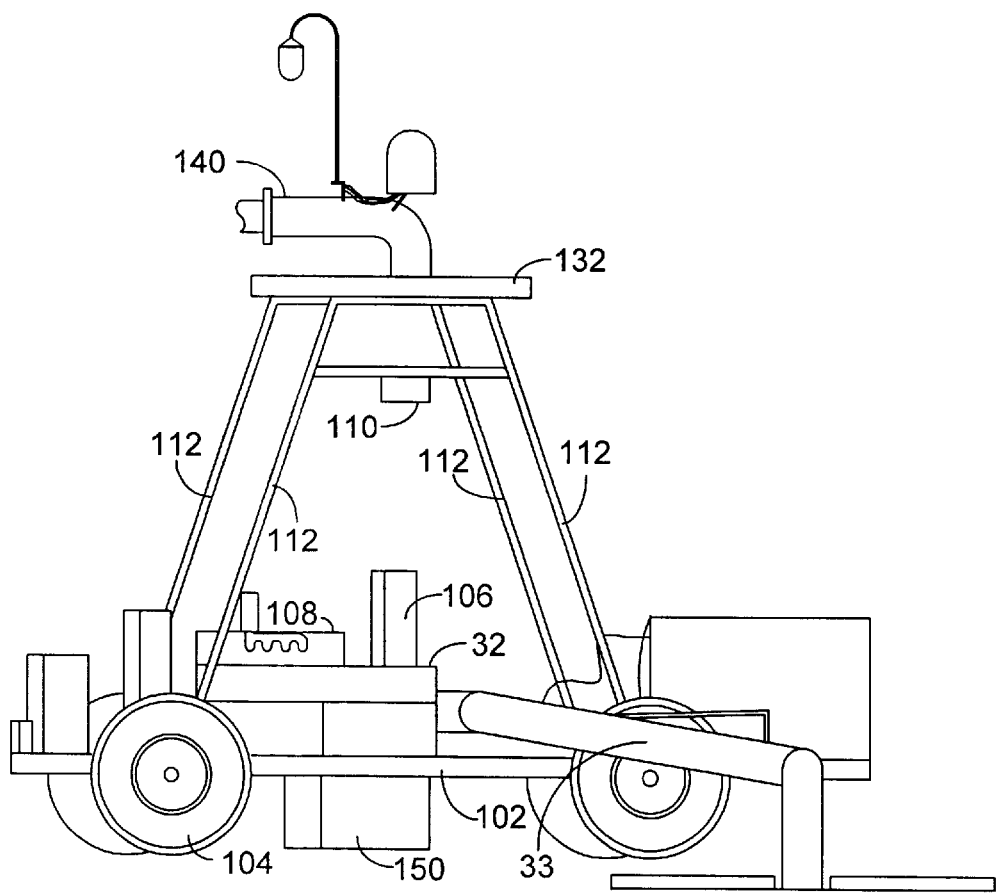
FIG. 6 illustrates a second embodiment of the power tower of the pivoting lateral move irrigation system of FIG. 3 which operates to water in the pivot mode, wherein the second embodiment includes a hydraulic lifting device for lifting and swiveling the power tower of the irrigation system.

FIG. 6—Power tower (Swiveling Embodiment)

FIG. 6 is a close up view of a second embodiment of the power tower 14A of the irrigation system 10 according to the present invention. The embodiment of FIG. 6 is similar to the embodiment of FIG. 4, and elements in FIG. 6 which are similar or identical to those in FIG. 4 have the same reference numerals for convenience.

Figure 7:
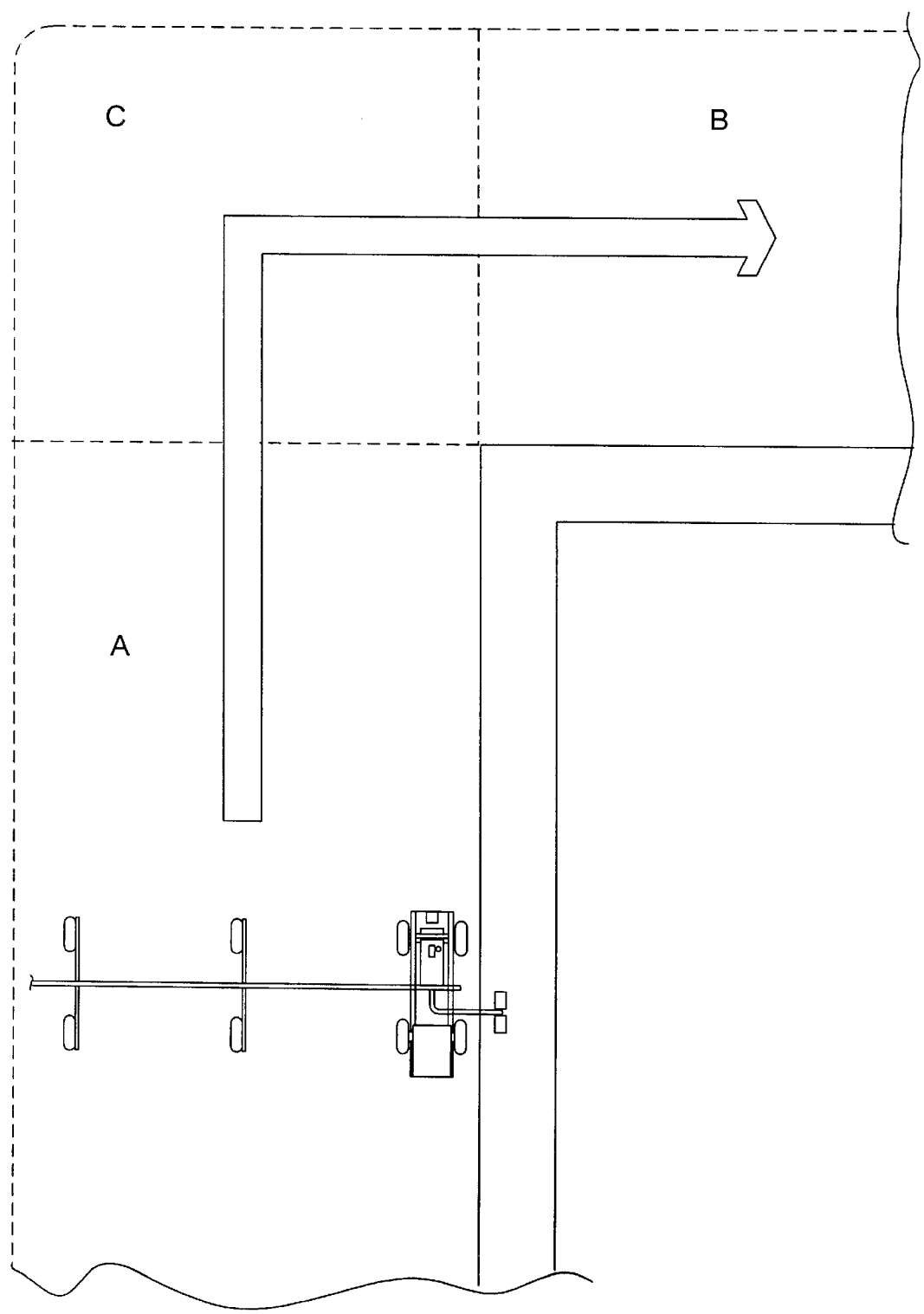
FIG. 7 illustrates one example of a field where the power tower of FIG. 6 may be used.

The power tower 14A of FIG. 6 is substantially identical to the power tower 14A of FIG. 4. However, this embodiment of the power tower 14A includes hydraulic equipment which enables swiveling of the power tower 14A to a new orientation for further lateral movement. This embodiment is designed to enable the irrigation system 10 to irrigate, for example, the field of FIG. 7. The operation of the irrigation system 10 irrigating the field of FIG. 7 is shown in FIGS. 7A–7G. It is noted that the power tower 14A of FIG. 6 is also operable to enable the irrigation system 10 to irrigate various other types of fields, as desired, such as other angularly shaped fields or the field of FIG. 5, among others.

FIG. 7—Example Operation

FIG. 7 illustrates an example field where the pivoting lateral move irrigation system 10 of the present invention including the power tower 14A of FIG. 6 may be used. FIG. 7 illustrates a field including an L shaped irrigation ditch or canal 30, wherein the irrigation system used in this field comprises a pivoting ditch fed lateral move irrigation system 10 of the present invention.

As shown, the irrigation ditch or canal 30 has an angular shape, here an L shape, including a first lateral portion and a second lateral portion. The field includes a first portion labeled A adjacent to the first lateral portion of the irrigation ditch, and the field includes a second portion labeled B adjacent to the second lateral portion of the irrigation ditch. As shown, the field further includes a third portion labeled C located between the first portion of the field and the second portion of the field, i.e., the upper left corner of the field.

Figure 7A:
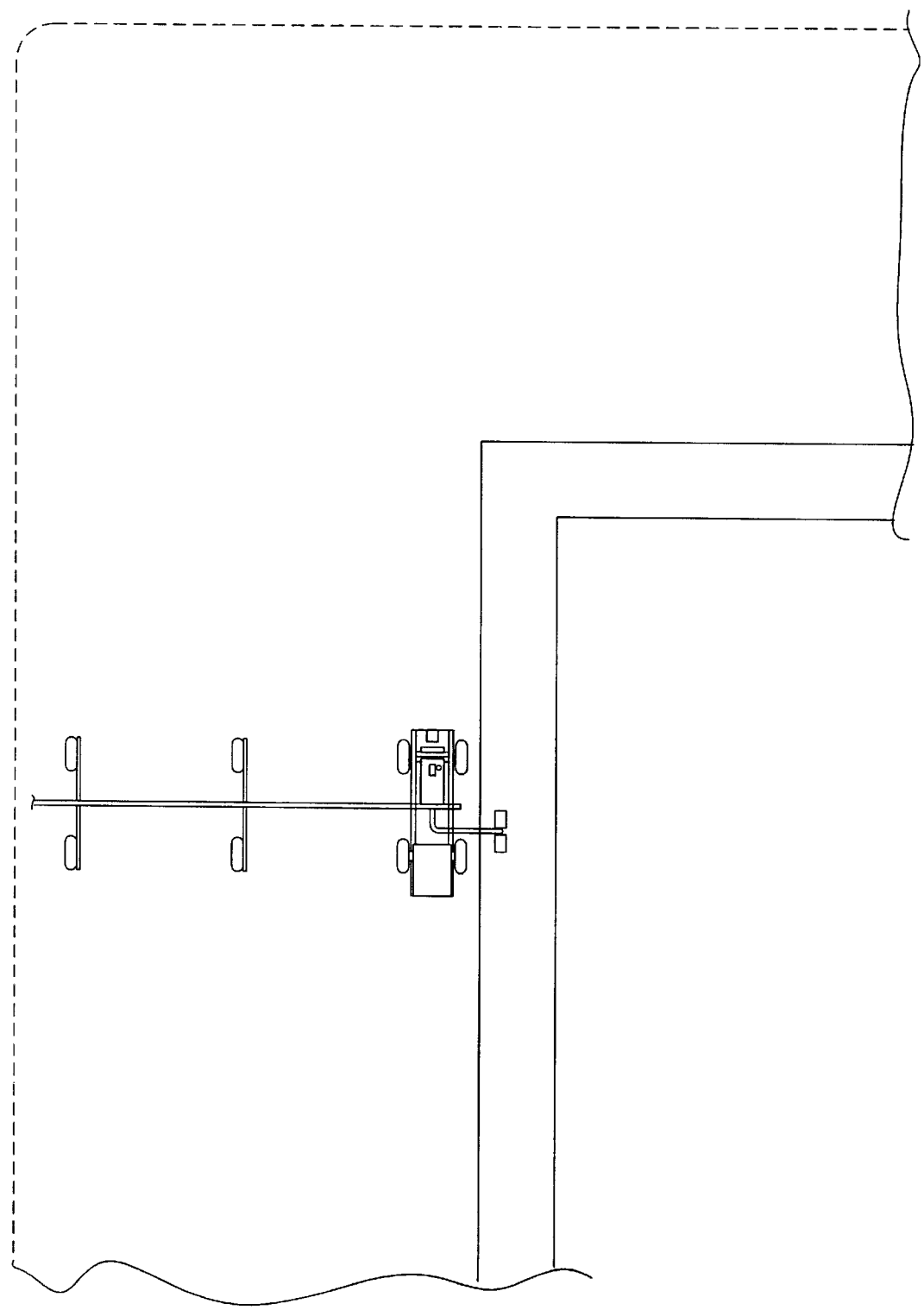
FIGS. 7A–7G illustrate movement of the irrigation system across the field of FIG. 7.
Figure 7B:
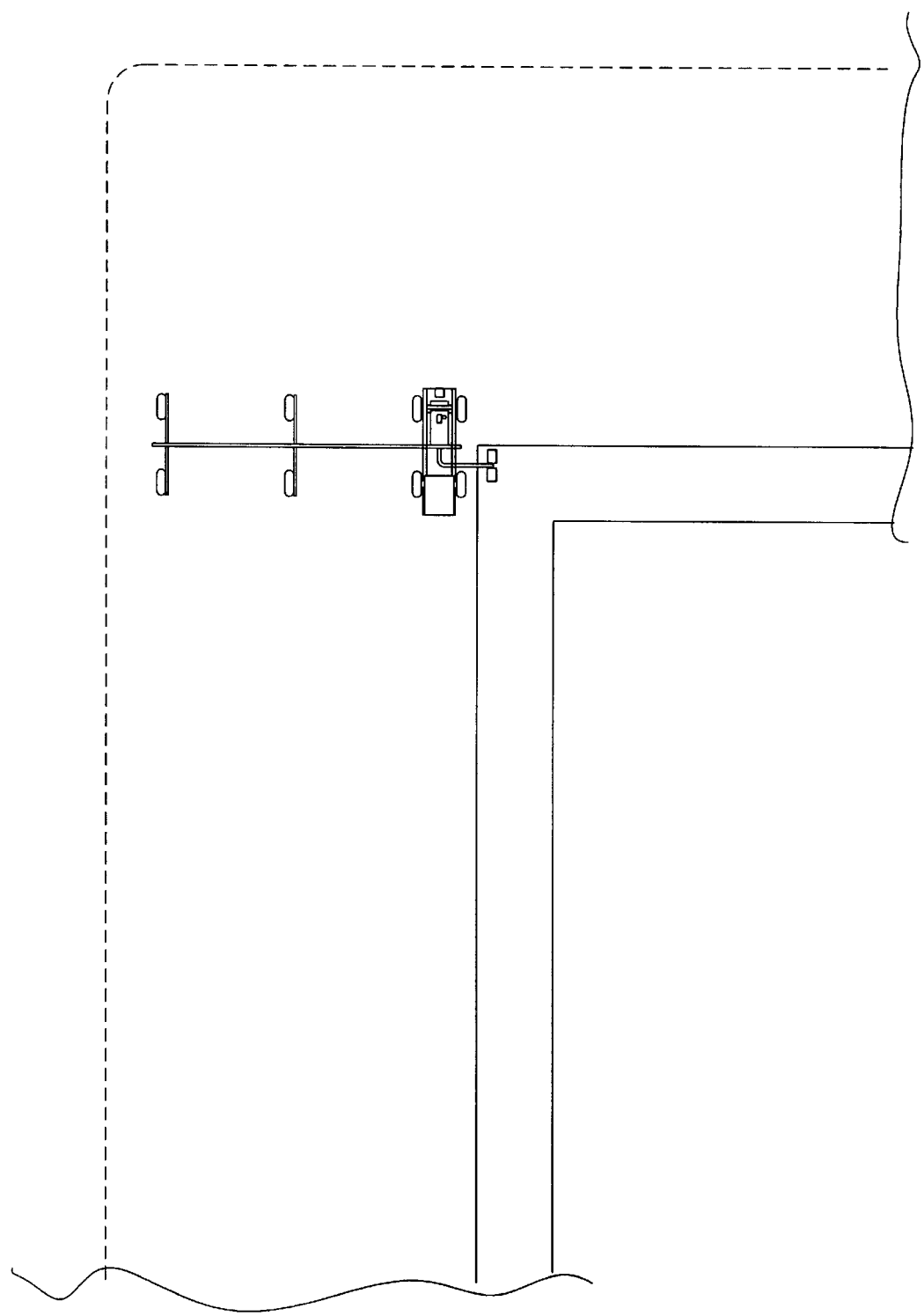

FIGS. 7A–7G illustrate movement of the irrigation system 10 to irrigate the field. As shown in FIGS. 7A and 7B, the irrigation system 10 moves laterally along the ditch 30 to irrigate the left portion of the field, labeled A. The power tower 14A moves laterally along the ditch as shown in FIGS. 7A and 7B until the power tower travels past the corner portion of the ditch 30, as shown in FIG. 7B. At this point, irrigation system 10 stops moving laterally and enters the pivot mode. In the preferred embodiment, at the end of the field, the "pivot/lateral" switch is depressed to enable the irrigation system 10 to pivot about the power tower 14A, i.e., to enable the conduit 12 and support towers 14 to be pivoted by the pivot top 140.

Figure 7C:
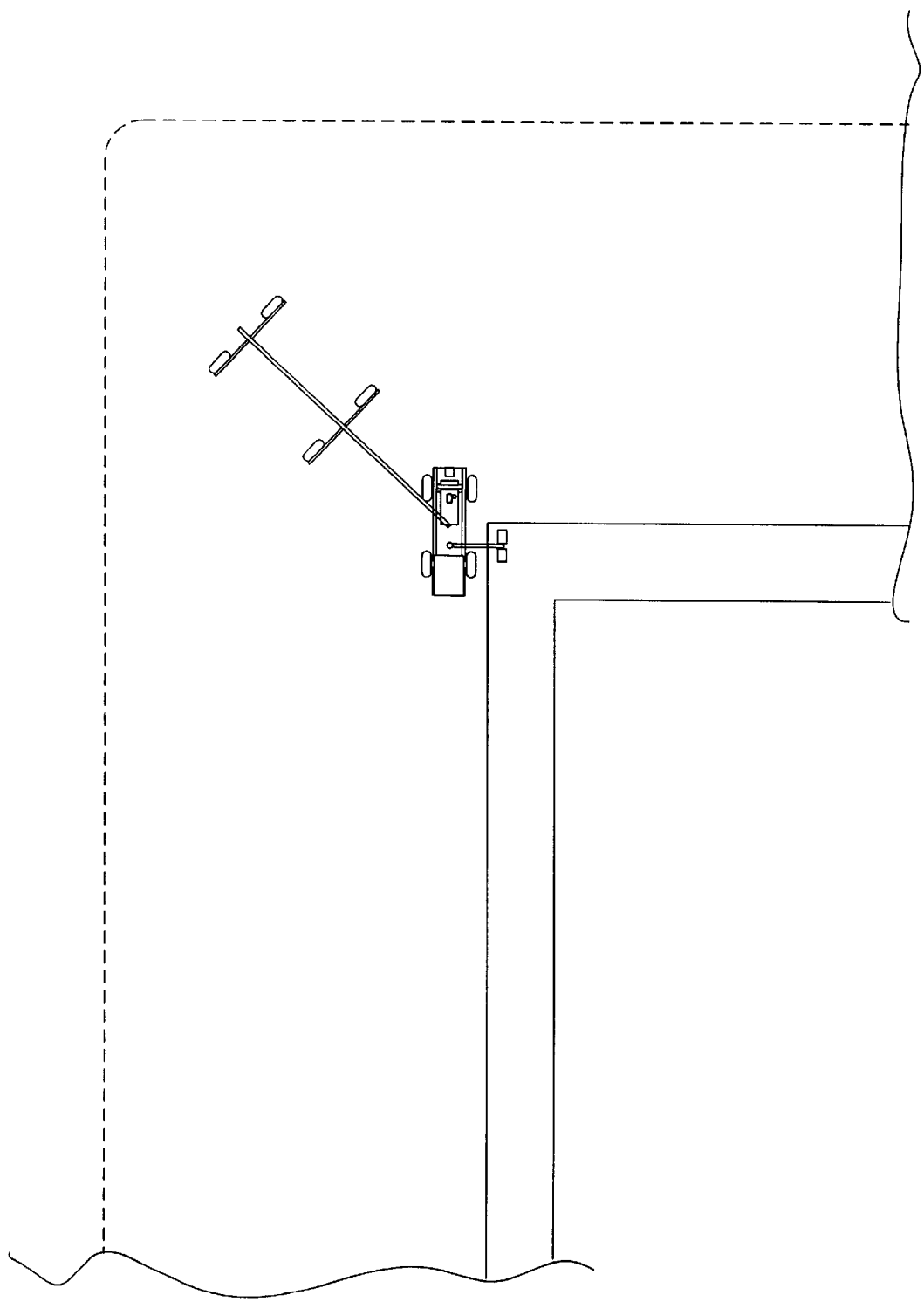
Figure 7D:
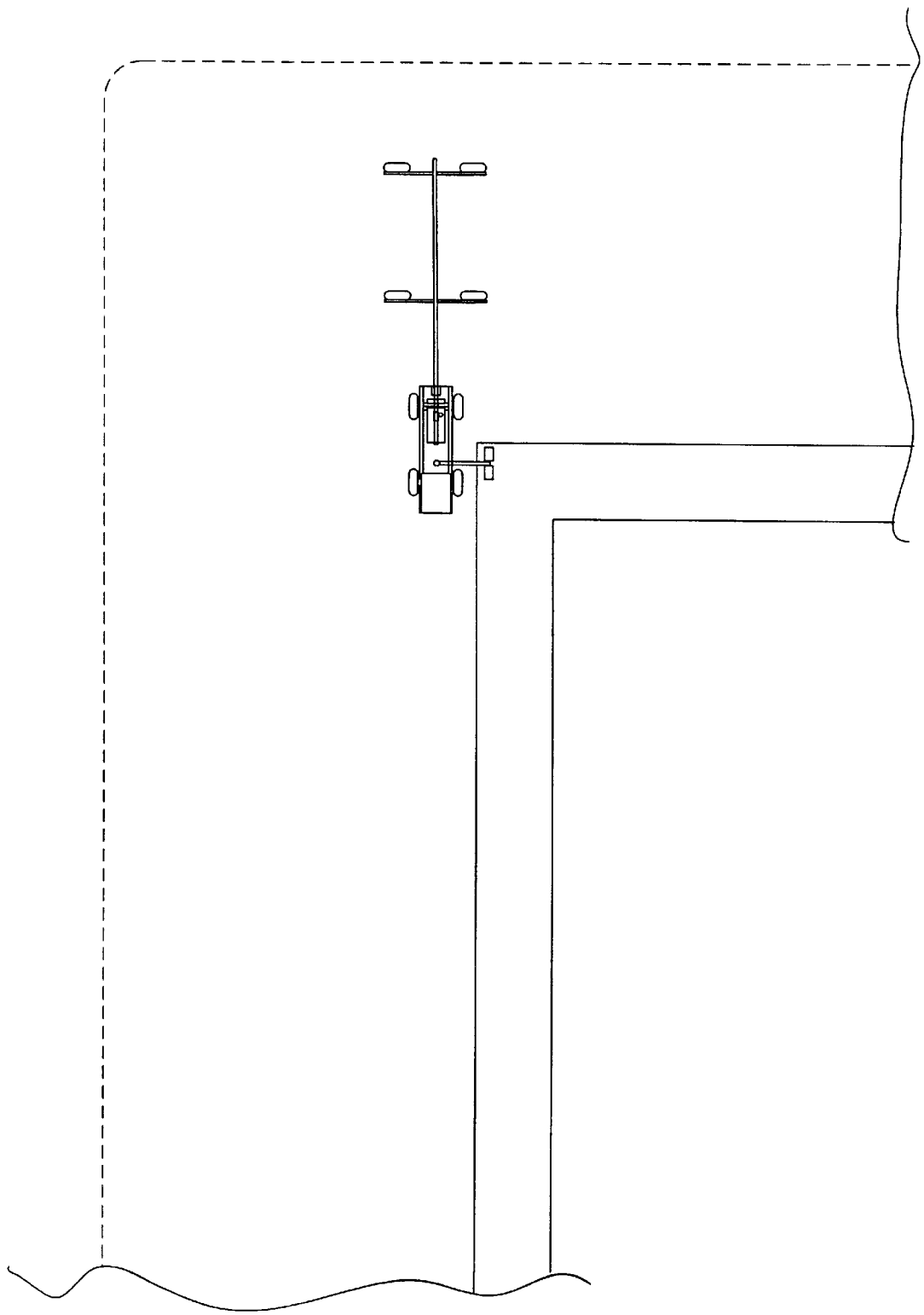

The irrigation system 10 then pivots 90 degrees to irrigate the top left corner of the field, labeled C, as shown in FIGS. 7B–7D. More particularly, the power tower 14A pivots the conduit 12 and support towers 14 approximately 90 degrees to irrigate the top left portion of the field. It is noted that, during pivoting, the irrigation system 10 still operates to irrigate, i.e., provide water to the field, during the pivot operation. Thus, during pivoting, the irrigation system 10 irrigates the upper left portion of the field, labeled C, as the conduit 12 and support towers 14 pivot from the position shown in FIG. 7B to the position shown in FIG. 7D.

Figure 7E:
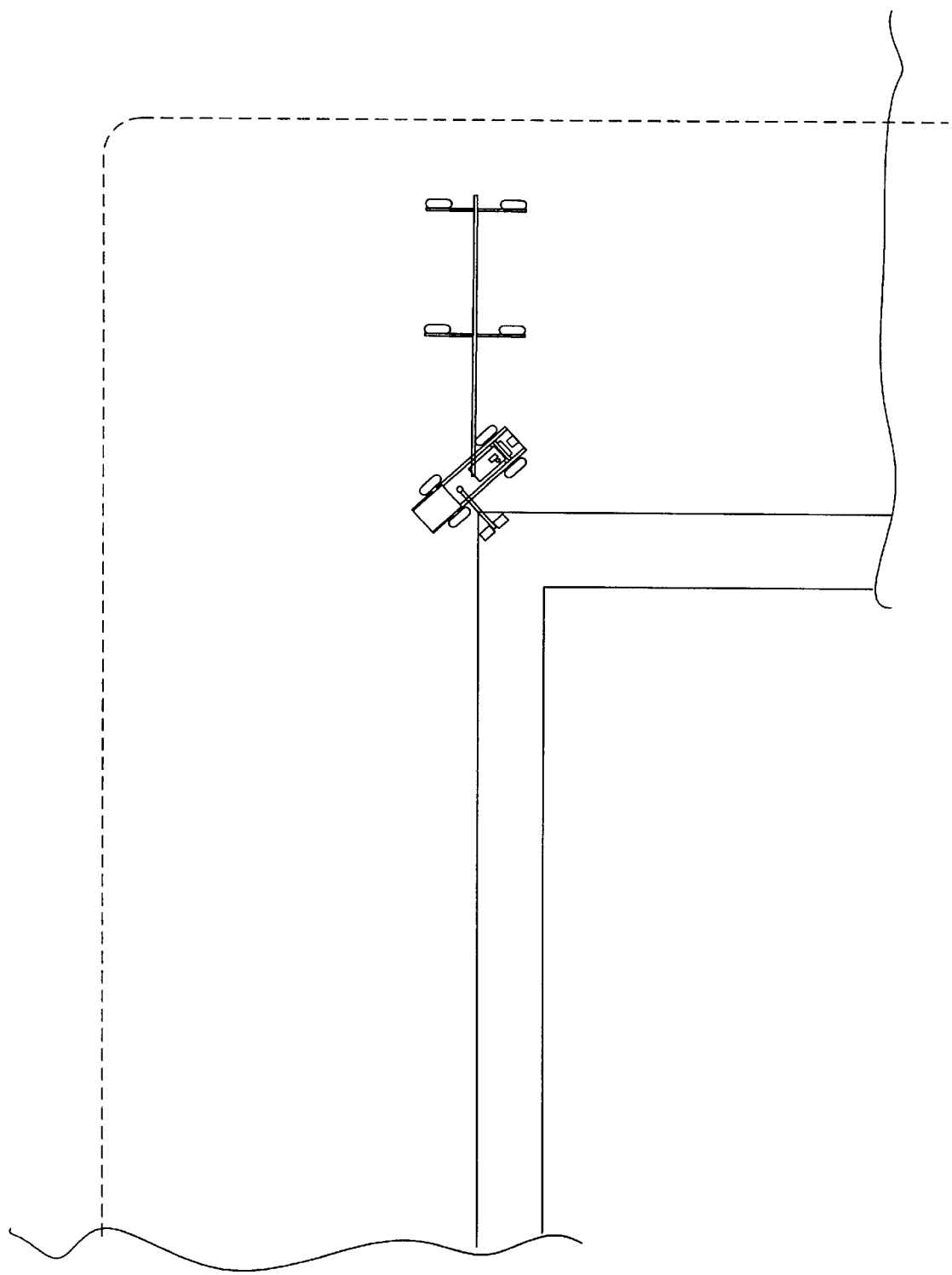
Figure 7F:
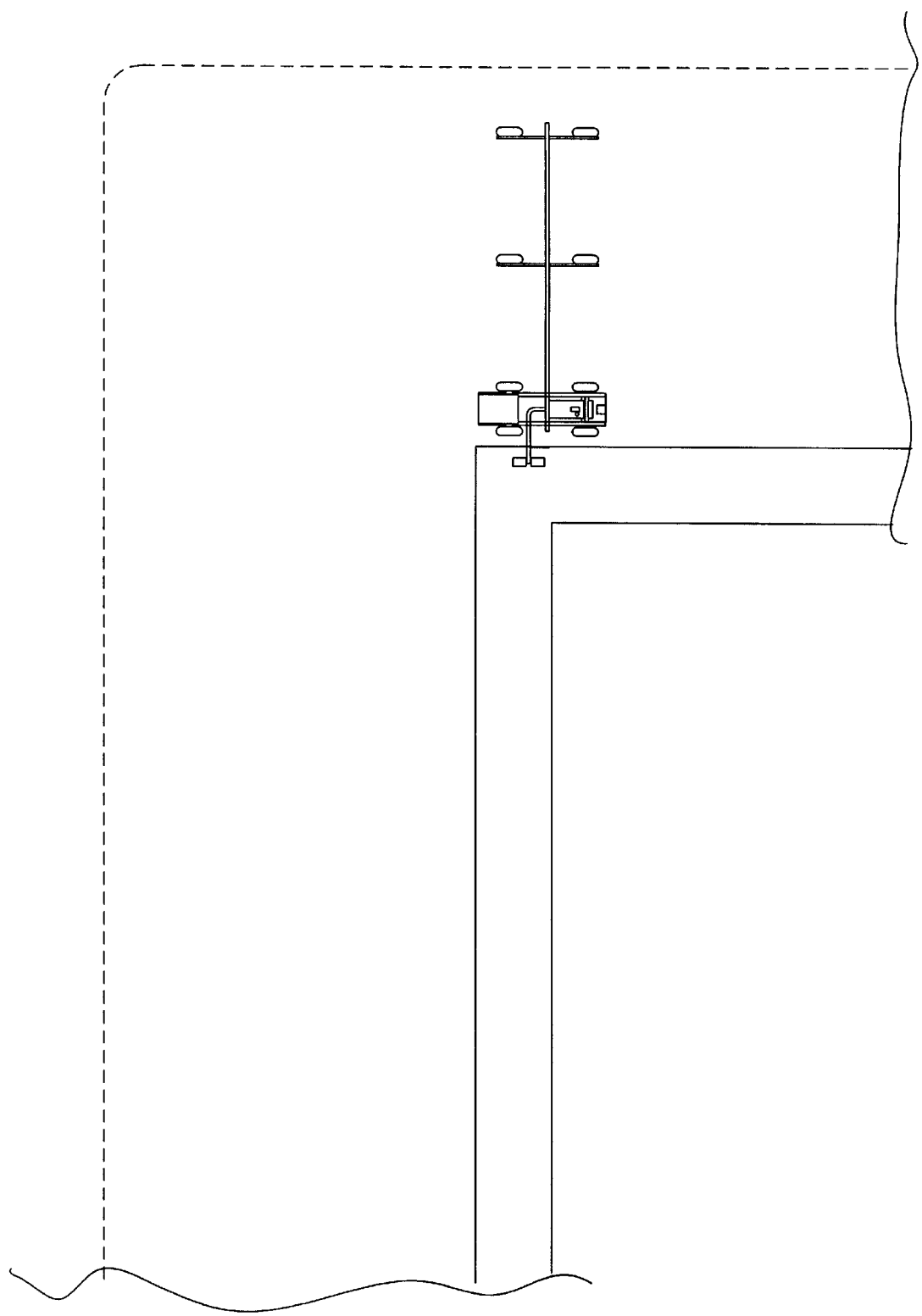
Figure 7G:
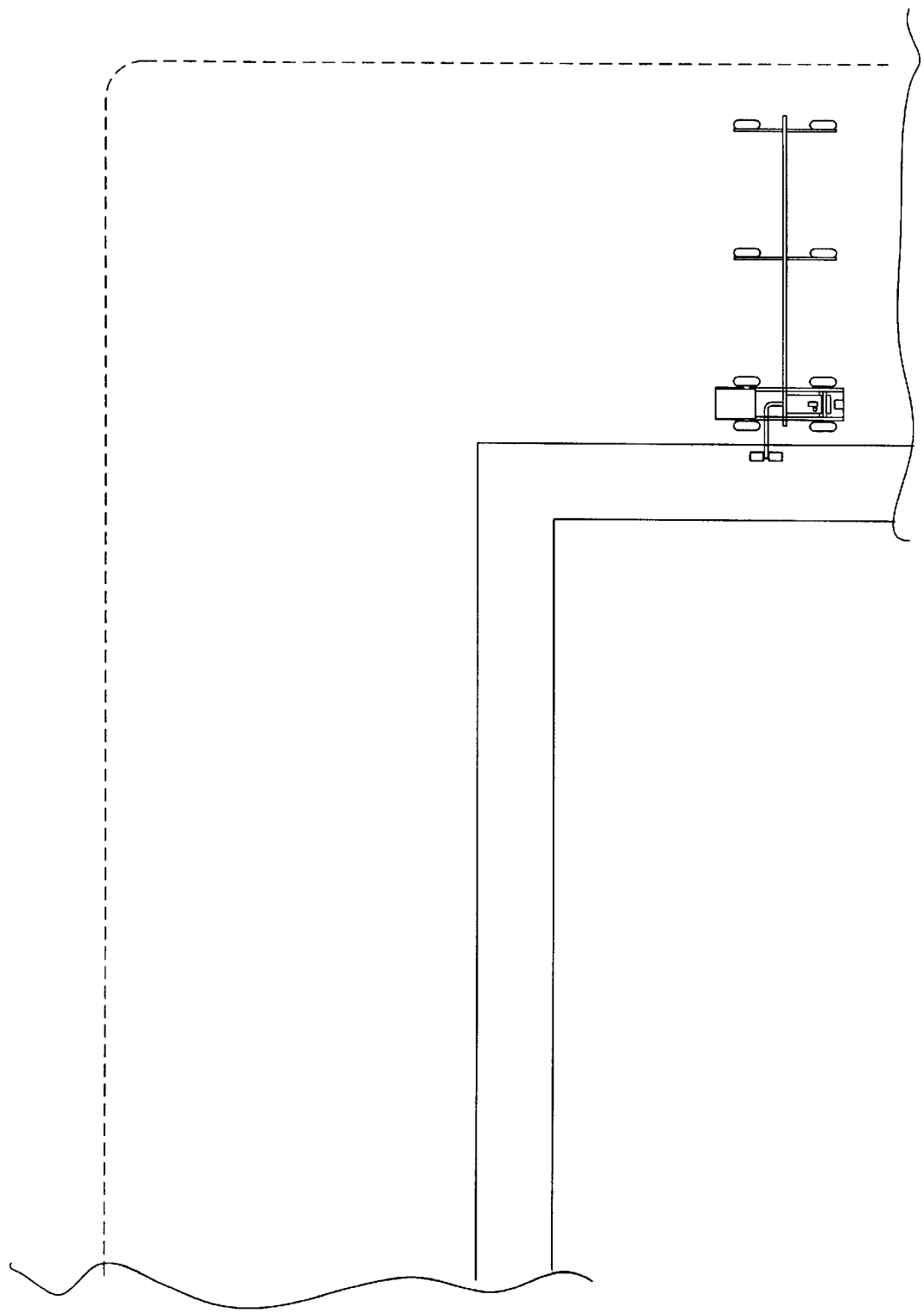

After the irrigation system 10 has completed pivoting, e.g., the conduit 12 and support towers 14 have pivoted the entire 90 degrees to the position shown in FIG. 7D, the power tower 14A then swivels to begin a new lateral movement. In one embodiment of the present invention, the hydraulic system 150 comprised on the power tower 14A is lowered to lift the wheels of the power tower 14A, i.e., the entire power tower 14A, off of the ground and turn or swivel the power tower 14A into a new position facing the remaining portion of the field, as shown in FIGS. 7E and 7F. After the power tower 14A has swiveled or turned to the new position, the power tower 14A resumes lateral movement to move across the remaining portion of the canal, as shown in the progression from FIG. 7F to FIG. 7G, to irrigate the remaining portion of the field, labeled B.

It is noted that the irrigation system 10 can pivot any desired number of degrees, e.g., between 10 degrees and 180 degrees. The irrigation system 10 preferably pivots a number of degrees depending on the configuration of the irrigation ditch 30 and/or field. Also, the pivot operation can occur before, during or after the swiveling of the power tower 14A, as desired.

Preferred Construction

In the preferred embodiment of the invention, a four wheel cart available from Reinke, part number 195815-G, was used. The top was then cut out or removed from the Reinke four wheel cart, and this top was replaced with a ¾ inch plate and associated braces. A Reinke pivot top or pivot assembly, which is Reinke part number 194201-G, was then mounted to the ¾ inch plate, preferably by welding and bolting the Reinke pivot top to the plate. The switches mentioned above, these being "pivot/lateral" and "panel outside span/panel inside span" were then added to the existing Reinke power panel. These switches enable the machine to pivot at the end of the field and then resume lateral movement operation after the pivoting procedure has been performed.

It is noted that in the preferred embodiment the pivoting lateral move irrigation system of the present invention is a ditch fed system. However, in an alternate embodiment of the invention, the pivoting lateral move irrigation system may instead receive water through other means.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A pivoting lateral move irrigation system which is operable for irrigating in the pivot mode, the irrigation system comprising:

a power tower including an input for receiving liquid for irrigation of a field;

a conduit extending from the power tower and including one or more dispensers for dispensing liquid fed through the conduit to the field;

a series of support towers which are attached to the conduit which are operable to support the conduit above the ground, wherein one or more of the support towers include a drive system associated therewith;

wherein the power tower is adapted to move laterally adjacent to the field during irrigation of the field, wherein the power tower includes a pivot top which is operable to pivot the conduit and said series of support towers, wherein the power tower is operable to provide liquid to the conduit for provision to the dispensers for irrigating the field during said pivoting operation;

wherein, during said pivoting operation, the irrigation system operates to irrigate a portion of the field that is not irrigated during lateral movement.

2. The pivoting lateral move irrigation system of claim 1, wherein the power tower is operable to obtain liquid and provide said liquid to the conduit to irrigate the field during said lateral movement;

wherein the power tower is operable to obtain liquid and provide said liquid to the conduit to irrigate the field during said pivoting operation.

3. The pivoting lateral move irrigation system of claim 1, wherein an irrigation ditch is located adjacent to the field on which the irrigation system moves;

wherein the power tower is operable to obtain liquid from said irrigation ditch and provide said liquid to the conduit to irrigate the field during said lateral movement;

wherein the power tower is operable to obtain liquid from said irrigation ditch and provide said liquid to the conduit to irrigate the field during said pivoting operation.

4. The pivoting lateral move irrigation system of claim 3, wherein the power tower further includes an inlet pipe extending therefrom which is in liquid communication with the irrigation ditch, said inlet pipe further being coupled to the conduit, whereby liquid in the irrigation ditch is provided through the inlet pipe and fed to the conduit for provision to the dispensers for irrigation of the field;

wherein said inlet pipe is operable to obtain liquid from the irrigation ditch and provide said liquid to the conduit for provision to the dispensers for irrigation of the field during said pivoting operation.

5. The pivoting lateral move irrigation system of claim 1, wherein said power tower is halted when said pivot top operates to pivot the conduit and said series of support towers.

6. The pivoting lateral move irrigation system of claim 1, wherein the power tower further comprises a hydraulic lift device for lifting the power tower above the ground, rotating the tower a desired number of degrees, and then lowering the power tower back to the ground for further lateral movement in a new direction.

7. The pivoting lateral move irrigation system of claim 1, wherein an irrigation ditch is located adjacent to the field;

wherein the power tower obtains liquid from the irrigation ditch and provides the liquid to the conduit for provision to the dispensers for irrigation of the field;

wherein the power tower further comprises a hydraulic lift device for lifting the power tower above the ground, rotating the tower a desired number of degrees, and then lowering the power tower back to the ground for further lateral movement in a new direction;

wherein said irrigation ditch has an angular shape including a first lateral portion and a second lateral portion, wherein said field includes a first portion adjacent to said first lateral portion of said irrigation ditch and wherein said field includes a second portion adjacent to said second lateral portion of said irrigation ditch, wherein said field further includes a third portion located between said first portion of said field and said second portion of said field;

wherein said irrigation system is operable to move laterally to irrigate said first portion of said field and wherein said power tower is operable to pivot said conduit and said series of support towers across said third portion of said field to irrigate said third portion of said field, wherein said power tower provides liquid to said conduit to irrigate said third portion of said field while said power tower is pivoting said conduit and said series of support towers across said third portion of said field;

wherein said hydraulic lift device is then operable to lift said power tower off of the ground and swivel said power tower a desired number of degrees and then lower said power tower to the ground facing a new direction;

wherein said irrigation system is then operable to move in a lateral manner in said new direction along said second portion of said irrigation ditch to irrigate said second portion of said field.

8. The pivoting lateral move irrigation system of claim 1, wherein an irrigation ditch is located adjacent to the field;

wherein the power tower obtains liquid from the irrigation ditch and provides the liquid to the conduit for provision to the dispensers for irrigation of the field;

wherein said irrigation ditch is positioned in an interior portion of the field, wherein said field includes a left portion located to the left of the irrigation ditch, a right portion located to the right of the irrigation ditch, and one or more of a top portion and a bottom portion above and below, respectively, the irrigation ditch;

wherein said conduit and said series of support towers are initially located on said left portion of said field;

wherein said irrigation system is operable to move laterally in a first direction substantially in parallel with said irrigation ditch to irrigate said left portion of said field;

wherein said power tower is operable to pivot said conduit and said series of support towers across said one of said top portion or said bottom portion of said field to irrigate one of said top portion or said bottom portion of said field, wherein said power tower provides liquid to said conduit to irrigate said one of said top portion or said bottom portion of said field while said power tower is pivoting said conduit and said series of support towers across said one of said top portion or said bottom portion of said field;

wherein after said pivoting said conduit and said series of support towers are located on said right portion of said field wherein said irrigation system is then operable to move in a lateral manner in a second direction substantially opposite said first direction to irrigate said right portion of said field.

9. The pivoting lateral move irrigation system of claim 1, wherein said pivot top is operable to pivot the conduit and said series of support towers in a range from 10 degrees to 180 degrees, wherein the power tower is operable to provide liquid to the conduit for provision to the dispensers for irrigating the field during said pivoting operation.

10. The pivoting lateral move irrigation system of claim 1, wherein the power tower comprises:
two or more wheels;
one or more lateral support members coupled to the wheels;
two or more braces coupled to the lateral members;
a pivot top coupled to the braces, wherein the pivot top is coupled to the conduit, wherein the pivot top is operable to pivot the conduit and said support towers in a pivoting fashion around the field; and
a pivot/lateral switch for placing the irrigation system in a lateral move mode or pivot mode.

11. A method for irrigating a field using a pivoting lateral move irrigation system which is operable for irrigating in the pivot mode, the method comprising:
the irrigation system moving laterally adjacent to the field to irrigate a first portion of the field, wherein the irrigation system comprises a power tower including an input for receiving liquid for irrigation of the field, a conduit extending from the power tower and including one or more dispensers for dispensing liquid fed through the conduit to the field, and a series of support towers which are attached to the conduit which are operable to support the conduit above the ground;
the power tower pivoting the conduit and said series of support towers after the irrigation system stops moving laterally, wherein the power tower provides liquid to the conduit for provision to the dispensers for irrigating a second portion of the field during said pivoting;
wherein the second portion of the field is not irrigated during the irrigation system moving laterally.

12. The method of claim 11,
wherein the irrigation system moving laterally adjacent to the field to irrigate the first portion of the field includes the power tower obtaining liquid and providing said liquid to the conduit to irrigate the first portion of the field during said moving laterally;
wherein the power tower pivoting the conduit and said series of support towers includes the power tower obtaining liquid and providing said liquid to the conduit to irrigate the second portion of the field during said pivoting.

13. The method of claim 11, wherein an irrigation ditch is located adjacent to the road on which the power tower moves;
wherein the irrigation system moving laterally adjacent to the field to irrigate the first portion of the field includes the power tower obtaining liquid from the irrigation ditch and providing said liquid to the conduit to irrigate the first portion of the field during said moving laterally;
wherein the power tower pivoting the conduit and said series of support towers includes the power tower obtaining liquid from the irrigation ditch and providing said liquid to the conduit to irrigate the second portion of the field during said pivoting.

14. The method of claim 11, further comprising:
the irrigation system moving laterally to irrigate at least a portion of the field after said pivoting.

15. The method of claim 11, further comprising:
the irrigation system halting movement after the irrigation system moving laterally and prior to the power tower pivoting the conduit and said series of support towers;
wherein said power tower is stopped during the power tower pivoting the conduit and said series of support towers.

16. The method of claim 11, further comprising:
the irrigation system moving laterally to irrigate a third portion of the field after said pivoting.

17. The method of claim 15, further comprising:
the irrigation system moving laterally to irrigate at least a portion of the field after said pivoting.

18. The method of claim 17, wherein an irrigation ditch is located adjacent to the field;
wherein the power tower obtains liquid from the irrigation ditch and provides the liquid to the conduit for provision to the dispensers for irrigation of the field;
wherein said irrigation ditch is positioned in an interior portion of the field, wherein said field includes a left portion located to the left of the irrigation ditch, a right portion located to the right of the irrigation ditch, and one or more of a top portion and a bottom portion above and below, respectively, the irrigation ditch;
wherein the irrigation system moving laterally comprises the irrigation system moving laterally in a first direction substantially in parallel with said irrigation ditch to irrigate said left portion of said field;
wherein the power tower pivoting the conduit and said series of support towers comprises the power tower pivoting the conduit and said series of support towers across one of said top portion or said bottom portion of said field to irrigate one of said top portion or said bottom portion of said field, wherein said power tower provides liquid to said conduit to irrigate said one of said top portion or said bottom portion of said field while said power tower is pivoting said conduit and said series of support towers across said one of said top portion or said bottom portion of said field;
wherein after said pivoting said conduit and said series of support towers are located on said right portion of said field;
wherein the irrigation system moving laterally to irrigate at least a portion of the field after said pivoting comprises the irrigation system moving laterally in a second direction substantially opposite said first direction to irrigate said right portion of said field.

19. The method of claim 18, wherein the irrigation system moving laterally includes the power tower moving laterally in a first direction, the method further comprising:
the power tower changing direction to face a second direction after the irrigation system halting movement;
wherein the irrigation system moving laterally to irrigate at least a portion of the field after said pivoting comprises the irrigation system moving laterally in said second direction to irrigate a third portion of the field after said pivoting and after the power tower changing direction.

20. The method of claim 19, wherein the power tower changing direction comprises:
lifting the power tower above the ground;
rotating the tower a desired number of degrees after said lifting; and
lowering the power tower back to the ground for further lateral movement in a new direction after said rotating.

21. The method of claim 19, wherein the power tower further comprises a hydraulic lift device;
wherein said hydraulic lift device performs said lifting, said rotating, and said lowering.

22. The method of claim 18, wherein the irrigation system moving laterally includes the power tower moving laterally in a first direction, the method further comprising:

the power tower changing direction to face a second direction after the irrigation system halting movement and after said pivoting;

wherein the irrigation system moving laterally comprises the irrigation system moving laterally in said second direction to irrigate a third portion of the field after said pivoting and after the power tower changing direction.

23. The method of claim 18, wherein an irrigation ditch is located adjacent to the field;

wherein the power tower obtains liquid from the irrigation ditch and provides the liquid to the conduit for provision to the dispensers for irrigation of the field;

wherein said irrigation ditch has an angular shape including a first lateral portion and a second lateral portion, wherein said field includes the first portion adjacent to said first lateral portion of said irrigation ditch and wherein said field includes a third portion adjacent to said second lateral portion of said irrigation ditch, wherein said field further includes the second portion located between said first portion of said field and said third portion of said field;

wherein the irrigation system moving laterally comprises the irrigation system moving laterally in a first direction to irrigate said first portion of said field;

wherein the power tower pivoting the conduit and said series of support towers comprises the power tower pivoting the conduit and said series of support towers across said second portion of said field to irrigate said second portion of said field;

the method further comprising:
the power tower changing direction to face a second direction after the irrigation system halting movement;

wherein the irrigation system moving laterally to irrigate at least a portion of the field after said pivoting comprises the irrigation system moving laterally in said second direction to irrigate said third portion of the field after said pivoting and after the power tower changing direction.

24. A method for irrigating a field using a pivoting lateral move irrigation system which is operable for irrigating in the pivot mode, the method comprising:

the irrigation system moving laterally in a first direction adjacent to the field to irrigate a first portion of the field, wherein the irrigation system comprises a power tower including an input for receiving liquid for irrigation of the field, a conduit extending from the power tower and including one or more dispensers for dispensing liquid fed through the conduit to the field, and a series of support towers which are attached to the conduit which are operable to support the conduit above the ground;

the irrigation system halting movement after the irrigation system moving laterally the power tower pivoting the conduit and said series of support towers after the irrigation system halting movement, wherein the power tower provides liquid to the conduit for provision to the dispensers for irrigating a second portion of the field during said pivoting, wherein said power tower is stopped during the power tower pivoting the conduit and said series of support towers, the power tower changing direction to face a second direction after the irrigation system halting movement;

the irrigation system moving laterally in the second direction to irrigate a third portion of the field after said pivoting and after the power tower changing direction.

25. The method of claim 24, wherein the power tower changing direction comprises:
lifting the power tower above the ground;
rotating the tower a desired number of degrees after said lifting; and
lowering the power tower back to the ground for further lateral movement in a new direction after said rotating.

26. A method for irrigating a field using a pivoting lateral move irrigation system which is operable for irrigating in the pivot mode, wherein an irrigation ditch is located adjacent to the field, wherein the irrigation system includes a power tower, a conduit extending from the power tower and including one or more dispensers for dispensing liquid to the field, and a series of support towers;

wherein the irrigation ditch is positioned in an interior portion of the field, wherein the field includes a left portion located to the left of the irrigation ditch, a right portion located to the right of the irrigation ditch, and one or more of a top portion and a bottom portion above and below, respectively, the irrigation ditch;

the irrigation system moving laterally in a first direction substantially in parallel with said irrigation ditch to irrigate said left portion of said field;

the power tower pivoting the conduit and said series of support towers across one of said top portion or said bottom portion of said field to irrigate one of said top portion or said bottom portion of said field, wherein said power tower provides liquid to said conduit to irrigate said one of said top portion or said bottom portion of said field while said power tower is pivoting said conduit and said series of support towers across said one of said top portion or said bottom portion of said field;

wherein after said pivoting said conduit and said series of support towers are located on said right portion of said field;

the irrigation system moving laterally in a second direction substantially opposite said first direction to irrigate said right portion of said field after said pivoting;

wherein said one of said top portion or said bottom portion of said field is not irrigated during lateral movement.

27. In a lateral move irrigation system for irrigating a field, the lateral move irrigation system having a conduit extending over the field to be irrigated, said conduit being supported above the ground by a series of support towers, the conduit having a series of liquid dispensers located along its length for dispensing liquid fed through the conduit to the field, and a power tower which receives liquid and supplies liquid to the conduit for operation of the irrigation system, wherein the power tower includes a pivot top for pivoting the irrigation system about a point, wherein the power tower is operable to receive and supply liquid to the conduit for irrigating the field during pivoting of the lateral move irrigation system, wherein, during said pivoting, the irrigation system operates to irrigate a portion of the field that is not irrigated during lateral movement.

28. In the lateral move irrigation system of claim 27,
wherein the power tower is operable to obtain liquid and provide said liquid to the conduit to irrigate the field during lateral movement;
wherein the power tower is operable to obtain liquid and provide said liquid to the conduit to irrigate the field during said pivoting.

29. In the lateral move irrigation system of claim 27, wherein the irrigation system is a ditch fed system which obtains liquid from an irrigation ditch for irrigating the field;

wherein the power tower further includes an inlet pipe extending therefrom which is in liquid communication with the irrigation ditch, said inlet pipe further being coupled to the conduit, whereby liquid in the irrigation ditch is provided through the inlet pipe and fed to the conduit for provision to the dispensers for irrigation of the field;

wherein said inlet pipe is operable to obtain liquid from the irrigation ditch and provide said liquid to the conduit for provision to the dispensers for irrigation of the field during said pivoting operation.

30. In the lateral move irrigation system of claim 27, wherein said power tower is halted when said pivot top operates to pivot the conduit and said series of support towers.

31. In the lateral move irrigation system of claim 30, wherein the power tower further includes a hydraulic lift system for lifting the power tower off the ground, rotating the power tower a desired number of degrees, and then lowering the power tower for further lateral movement in a new direction.

32. In the lateral move irrigation system of claim 27, wherein the power tower comprises:

two or more wheels;

one or more lateral support members coupled to the wheels;

two or more braces coupled to the lateral members; and a pivot top coupled to the braces, wherein the pivot top is coupled to the conduit, wherein the pivot top is operable to pivot the conduit and said support towers in a pivoting fashion around the field.

33. In the linear move irrigation system of claim 27, wherein the power tower includes a pivot/lateral switch for placing the irrigation system in a lateral move mode or pivot mode.

34. A method for irrigating a field using a pivoting lateral move irrigation system which is operable for irrigating in the pivot mode, wherein an irrigation ditch is located adjacent to the field;

wherein said irrigation ditch has an angular shape including a first lateral portion and a second lateral portion, wherein said field includes a first portion adjacent to said first lateral portion of said irrigation ditch and wherein said field includes a second portion adjacent to said second lateral portion of said irrigation ditch, wherein said field further includes a third portion located between said first portion of said field and said second portion of said field;

the method comprising:

the irrigation system moving laterally in a first direction adjacent to the first portion of the field to irrigate the first portion of the field, wherein the irrigation system includes a conduit for dispensing liquid to the field;

the irrigation system pivoting the conduit across said third portion of said field to irrigate said third portion of said field after the irrigation system moving laterally;

the irrigation system changing direction to face a second direction; and the irrigation system moving laterally in said second direction to irrigate said second portion of the field after said pivoting and after the irrigation system changing direction.

35. A pivoting lateral move irrigation system which is operable for irrigating in the pivot mode, the irrigation system comprising:

a power tower including an input for receiving liquid for irrigation of a field;

a conduit extending from the power tower and including one or more dispensers for dispensing liquid fed through the conduit to the field;

a series of support towers which are attached to the conduit which are operable to support the conduit above the ground, wherein one or more of the support towers include a drive system associated therewith;

wherein the power tower is adapted to move laterally adjacent to the field during irrigation of the field, wherein the power tower includes a pivot top which is operable to pivot the conduit and said series of support towers, wherein the power tower is operable to provide liquid to the conduit for provision to the dispensers for irrigating the field during said pivoting operation;

wherein the power tower further comprises a hydraulic lift device for lifting the power tower above the ground, rotating the tower a desired number of degrees, and then lowering the power tower back to the ground for further lateral movement in a new direction.

36. A pivoting lateral move irrigation system which is operable for irrigating in the pivot mode, the irrigation system comprising:

a power tower including an input for receiving liquid for irrigation of a field;

a conduit extending from the power tower and including one or more dispensers for dispensing liquid fed through the conduit to the field;

a series of support towers which are attached to the conduit which are operable to support the conduit above the ground, wherein one or more of the support towers include a drive system associated therewith;

wherein the power tower is adapted to move laterally adjacent to the field during irrigation of the field, wherein the power tower includes a pivot top which is operable to pivot the conduit and said series of support towers, wherein the power tower is operable to provide liquid to the conduit for provision to the dispensers for irrigating the field during said pivoting operation;

wherein an irrigation ditch is located adjacent to the field;

wherein the power tower obtains liquid from the irrigation ditch and provides the liquid to the conduit for provision to the dispensers for irrigation of the field;

wherein the power tower further comprises a hydraulic lift device for lifting the power tower above the ground, rotating the tower a desired number of degrees, and then lowering the power tower back to the ground for further lateral movement in a new direction;

wherein said irrigation ditch has an angular shape including a first lateral portion and a second lateral portion, wherein said field includes a first portion adjacent to said first lateral portion of said irrigation ditch and wherein said field includes a second portion adjacent to said second lateral portion of said irrigation ditch, wherein said field further includes a third portion located between said first portion of said field and said second portion of said field;

wherein said irrigation system is operable to move laterally to irrigate said first portion of said field and wherein said power tower is operable to pivot said conduit and said series of support towers across said third portion of said field to irrigate said third portion of said field, wherein said power tower provides liquid to said conduit to irrigate said third portion of said field while said power tower is pivoting said conduit and said series of support towers across said third portion of said field;

wherein said hydraulic lift device is operable to lift said power tower off of the ground and swivel said power tower a desired number of degrees and then lower said power tower to the ground facing a new direction after irrigating said first portion of said field;

wherein said irrigation system is then operable to move in a lateral manner in said new direction along said second portion of said irrigation ditch to irrigate said second portion of said field.

37. A method for irrigating a field using a pivoting lateral move irrigation system which is operable for irrigating in the pivot mode, wherein an irrigation ditch is located adjacent to the field;

wherein said irrigation ditch has an angular shape including a first lateral portion and a second lateral portion, wherein said field includes a first portion adjacent to said first lateral portion of said irrigation ditch and wherein said field includes a second portion adjacent to said second lateral portion of said irrigation ditch, wherein said field further includes a third portion located between said first portion of said field and said second portion of said field;

the method comprising:

the irrigation system moving laterally in a first direction adjacent to the first portion of the field to irrigate the first portion of the field, wherein the irrigation system comprises a power tower including an input for receiving liquid for irrigation of the field, a conduit extending from the power tower and including one or more dispensers for dispensing liquid fed through the conduit to the field, and a series of support towers which are attached to the conduit which are operable to support the conduit above the ground, wherein the power tower obtains liquid from the irrigation ditch and provides the liquid to the conduit for provision to the dispensers for irrigation of the field;

the power tower pivoting the conduit and said series of support towers across said third portion of said field to irrigate said third portion of said field after the irrigation system moving laterally, wherein the power tower provides liquid to the conduit for provision to the dispensers for irrigating said third portion of the field during said pivoting;

the power tower changing direction to face a second direction;

the irrigation system moving laterally in said second direction to irrigate said second portion of the field after said pivoting and after the power tower changing direction.

* * * * *